US010740007B2

(12) United States Patent
Borlick et al.

(10) Patent No.: US 10,740,007 B2
(45) Date of Patent: Aug. 11, 2020

(54) SYNCHRONIZED PRIMARY-SECONDARY ROLE SWAPS WITH SYNCHRONIZED SAFE DATA COMMIT SCANS

(71) Applicant: International Business Machines Corporation, Armonk, NY (US)

(72) Inventors: Matthew G. Borlick, Tucson, AZ (US); Lokesh M. Gupta, Tucson, AZ (US); Roger G. Hathorn, Tucson, AZ (US); Gregory E. McBride, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 44 days.

(21) Appl. No.: 15/913,748

(22) Filed: Mar. 6, 2018

(65) Prior Publication Data

US 2019/0278492 A1 Sep. 12, 2019

(51) Int. Cl.
*G06F 12/00* (2006.01)
*G06F 3/06* (2006.01)
(Continued)

(52) U.S. Cl.
CPC ............ *G06F 3/0619* (2013.01); *G06F 3/065* (2013.01); *G06F 3/067* (2013.01); *G06F 3/0656* (2013.01);
(Continued)

(58) Field of Classification Search
CPC ........ G06F 3/065; G06F 3/0604; G06F 3/067; G06F 3/0653
See application file for complete search history.

(56) References Cited

U.S. PATENT DOCUMENTS 6,292,905 B1 9/2001 Wallach et al.
7,127,512 B2 10/2006 Minear et al.
(Continued)

FOREIGN PATENT DOCUMENTS

CN 1591397 A 3/2005
CN 1729455 A 2/2006
(Continued)

OTHER PUBLICATIONS

Anonymous, "Load-balanced Redundant Asynchronous Mirroring Support for Hyperswap", dated Jun. 1, 2010, An IP.com Prior Art Database Technical Disclosure, Total 3 pages.
(Continued)

*Primary Examiner* — David Yi
*Assistant Examiner* — Tahilba O Puche
(74) *Attorney, Agent, or Firm* — William K. Konrad; Konrad, Raynes, Davda and Victor LLP

(57) ABSTRACT

In one aspect of the present description, a primary-secondary role swap operation which swaps roles of primary and secondary data storage systems in a distributed data storage system, is synchronized with safe data commit scan operations of individual data storage systems. The safe data commit scan operations of the individual data storage systems are also synchronized to ensure completion of the safe data commit scans and to reduce the occurrence of reductions in input/output (I/O) response times prior to initiation of a primary-secondary role swap operation. Other features and aspects may be realized, depending upon the particular application.

22 Claims, 10 Drawing Sheets

(51) Int. Cl.
*G06F 12/0842* (2016.01)
*G06F 12/0804* (2016.01)

(52) U.S. Cl.
CPC ...... *G06F 12/0804* (2013.01); *G06F 12/0842* (2013.01); *G06F 2212/1032* (2013.01); *G06F 2212/154* (2013.01); *G06F 2212/254* (2013.01)

(56) References Cited

U.S. PATENT DOCUMENTS

| | | | |
|---|---|---|---|
| 7,203,807 | B2 | 4/2007 | Urabe et al. |
| 7,370,163 | B2 * | 5/2008 | Yang ................... G06F 3/0617 365/189.05 |
| 7,506,011 | B2 | 3/2009 | Liu et al. |
| 8,452,933 | B2 | 5/2013 | Inoue et al. |
| 8,538,926 | B2 | 9/2013 | Barton et al. |
| 8,595,455 | B2 | 11/2013 | Chatterjee et al. |
| 8,650,155 | B2 * | 2/2014 | Corbin ................... G06F 9/466 707/615 |
| 8,914,671 | B2 | 12/2014 | Rooney et al. |
| 8,924,354 | B2 | 12/2014 | Wang et al. |
| 9,092,142 | B2 * | 7/2015 | Nashimoto ............. G06F 3/061 |
| 9,141,630 | B2 | 9/2015 | Patel et al. |
| 9,165,012 | B2 | 10/2015 | Agrawal et al. |
| 9,600,683 | B1 | 3/2017 | Whaley et al. |
| 9,639,294 | B2 | 5/2017 | Prahlad et al. |
| 2009/0313428 | A1 | 12/2009 | De Jong |
| 2016/0378614 | A1 | 12/2016 | Thanasekaran |
| 2017/0161349 | A1 | 6/2017 | Harris, Jr. et al. |

FOREIGN PATENT DOCUMENTS

| | | |
|---|---|---|
| CN | 101446972 A | 6/2009 |
| CN | 103745353 A | 4/2014 |
| CN | 107124317 | 9/2017 |

OTHER PUBLICATIONS

Dillenberger, D.et al., "A Contrast Between Mainframe Parallel Sysplex Availability and Selected Distributed Computing Availability Solutions", dated 2013, IBM Journal of Research and Development, Total 14 pages.
Junghee, L. et al., "Synchronous I/O Scheduling of Independent Write Caches for an Array of SSDs", dated 2015, IEEE Computer Architecture Letters, Total 4 pages.
US Patent Application, dated Mar. 6, 2018, for U.S. Appl. No. 15/913,735 (18.779), invented by Lokesh M. Gupta et al., filed Mar. 6, 2018, Total 68 pages.
Response to Office Action, dated Sep. 6, 2019, for U.S. Appl. No. 15/913,735 (18.779), invented by Lokesh M. Gupta et al., filed Mar. 6, 2018, Total 18 pages.
Office Action1, dated Jun. 6, 2018, for U.S. Appl. No. 15/913,735 (18.779), invented by Lokesh M. Gupta et al., filed Mar. 6, 2018, Total 22 pages.
International Search Report and Written Opinion, dated May 29, 2019, International Application No. PCT/IB2019/051576, Total 9 pages.
Machine Translation for CN1591397A, published Mar. 9, 2005, Total 38 pages.
Machine Translation for CN1729455A, published Feb. 1, 2006, Total 20 pages.
Machine Translation for CN101446972A, published Jun. 3, 2006, Total 22 pages.
Machine Translation for CN103745353A, published Apr. 23, 2014, Total 6 pages.
Final Office Action1, dated Oct. 31, 2019, for U.S. Appl. No. 15/913,735 (18.779), invented by Lokesh M. Gupta et al., filed Mar. 6, 2018, Total 28 pages.
Response to Final Office Action, dated Dec. 24, 2019, for U.S. Appl. No. 15/913,735 (18.779), invented by Lokesh M. Gupta et al., filed Mar. 6, 2018, Total 15 pages.
Notice of Allowance, dated Jan. 21, 2020, for U.S. Appl. No. 15/913,735 (18.779), invented by Lokesh M. Gupta et al., filed Mar. 6, 2018, Total 17 pages.

* cited by examiner

SYNCHRONIZED PRIMARY-SECONDARY ROLE SWAPS WITH SYNCHRONIZED SAFE DATA COMMIT SCANS

BACKGROUND OF THE INVENTION

1. Field of the Invention

The present invention relates to a computer program product, system, and method for synchronized primary-secondary role swaps with synchronized safe data commit scans in multiple data storage systems.

2. Description of the Related Art

Data storage systems, particularly at the enterprise level, are usually designed to provide a high level of redundancy to reduce the risk of data loss in the event of failure of a component of the data storage system. Thus, multiple copies of data are frequently stored on multiple systems of a distributed data storage system in which individual data storage systems may be geographically dispersed. Accordingly, data from a host to be stored in the distributed data storage system is typically directed to a primary device of a primary data storage system at a local site and then replicated to one or more secondary devices of secondary data storage systems which may be geographically remote systems from the primary data storage system. One primary device can have multiple secondary relationships in which data directed to a primary device is replicated to multiple secondary devices.

The process of replicating, that is, copying or mirroring data over to the secondary data storage device can be setup in either a synchronous or asynchronous relationship between the primary data storage device and the secondary data storage device. In a synchronous relationship, any updates to the primary data storage device are typically synchronized with the secondary data storage device, that is, successfully copied over to the secondary data storage device, before the primary data storage device reports to the host that the data storage input/output (I/O) operation has been successfully completed. In an asynchronous relationship, successful updates to the primary data storage device are typically reported to the host as a successful storage input/output operation without waiting for the update to be replicated to the secondary data storage device.

A storage controller may control a plurality of storage devices that may include hard disks, tapes, solid state drives, etc. A cache may also be maintained by the storage controller, where the cache may comprise a high speed storage that is accessible more quickly in comparison to certain other storage devices, such as, hard disks, tapes, etc. However, the total amount of storage capacity of the cache may be relatively small by comparison to the storage capacity of certain other storage devices, such as, hard disks, etc., that are controlled by the storage controller. The cache may be comprised of one or more of random access memory (RAM), non-volatile storage device (NVS), read cache, write cache, etc., that may interoperate with each other in different ways. The NVS may be comprised of a battery backed-up random access memory and may allow write operations to be performed at a high speed. The storage controller may manage Input/Output (I/O) requests from networked hosts to the plurality of storage devices.

Caching techniques implemented by the storage controller assist in hiding input/output (I/O) latency. The cache is used for rapid access to data staged from external storage to service read data access requests, and to provide buffering of modified data. Write requests are written to the cache and then written (i.e., destaged) to the external storage devices.

To guarantee continued low latency for writes, the data in the NVS may have to be drained, that is destaged, so as to ensure that there is always some empty space for incoming writes; otherwise, follow-on writes may become effectively synchronous, which may adversely impact the response time for host writes. Storage controllers frequently employ a safe data commit scan process which scans the cache directory for modified (often referred to as "dirty") data to be destaged to storage. Such a scan of the cache directory may be initiated using a timer to initiate scans on a periodic basis, such as on the hour, for example. A safe data commit process may also be initiated to completely empty a cache in anticipation of other events such as a programming load for a processor which caches data in the particular cache, or a swapping of the primary and secondary roles of primary and secondary data storage systems, for example. In data storage systems marked by International Business Machines Corporation (IBM), such primary-secondary role swaps are referred to as a "HyperSwap" (HyperSwap and IBM are registered trademarks of IBM).

Upon completion of a safe data commit scan operation, the time at which the scan was started is typically logged as a "timestamp" which permits an operator to be assured that anything written to cache of the data storage system prior to the safe data commit scan start time, has been successfully destaged and safely stored on the storage of the data storage system. However, such safe data commit scan operations can consume significant system resources causing a noticeable slow down in response times of concurrent input/output operations. Such a slow down in response times may be repeated each time an individual data storage system of a distributed data storage system conducts a safe data commit scan operation.

As a result, prior to performing a primary-secondary role swap, an operator of a distributed data storage system may experience multiple such slow downs in response times of input/output operations as safe data commit scan operations are being performed by the various individual data storage systems of the distributed data storage system. Moreover, safe data commit operations being performed in multiple data storage systems of a distributed data storage system can adversely affect a primary-secondary role swap in the distributed data storage system if safe data commit scan operations of data storage systems affected by the swap are not completed prior to initiation of the swap.

SUMMARY

One general aspect of a computing environment employing synchronized primary-secondary role swaps with synchronized safe data commit scans in multiple data storage systems includes synchronizing a first plurality of safe data commit scan operations in a plurality of data storage systems including a first data storage system configured as a primary data storage system and a second data storage system configured as a secondary data storage system. Each safe data commit scan operation destages data cached in a cache of a data storage system to a data storage unit of a data storage system. The first data storage system receives a completion message indicating completion of the safe data commit scan operation in at least the second data storage system of the plurality of data storage systems. In in response to the completion message indicating completion of the safe data commit scan operation in at least the second data storage system, a role swapping operation is performed such the second data storage system is reconfigured as a primary data storage system and the first data storage system is reconfigured as a secondary data storage system.

Implementations of the described techniques may include hardware, a method or process, or computer software on a computer-accessible medium. Other features and aspects may be realized, depending upon the particular application.

DETAILED DESCRIPTION

Figure 1:
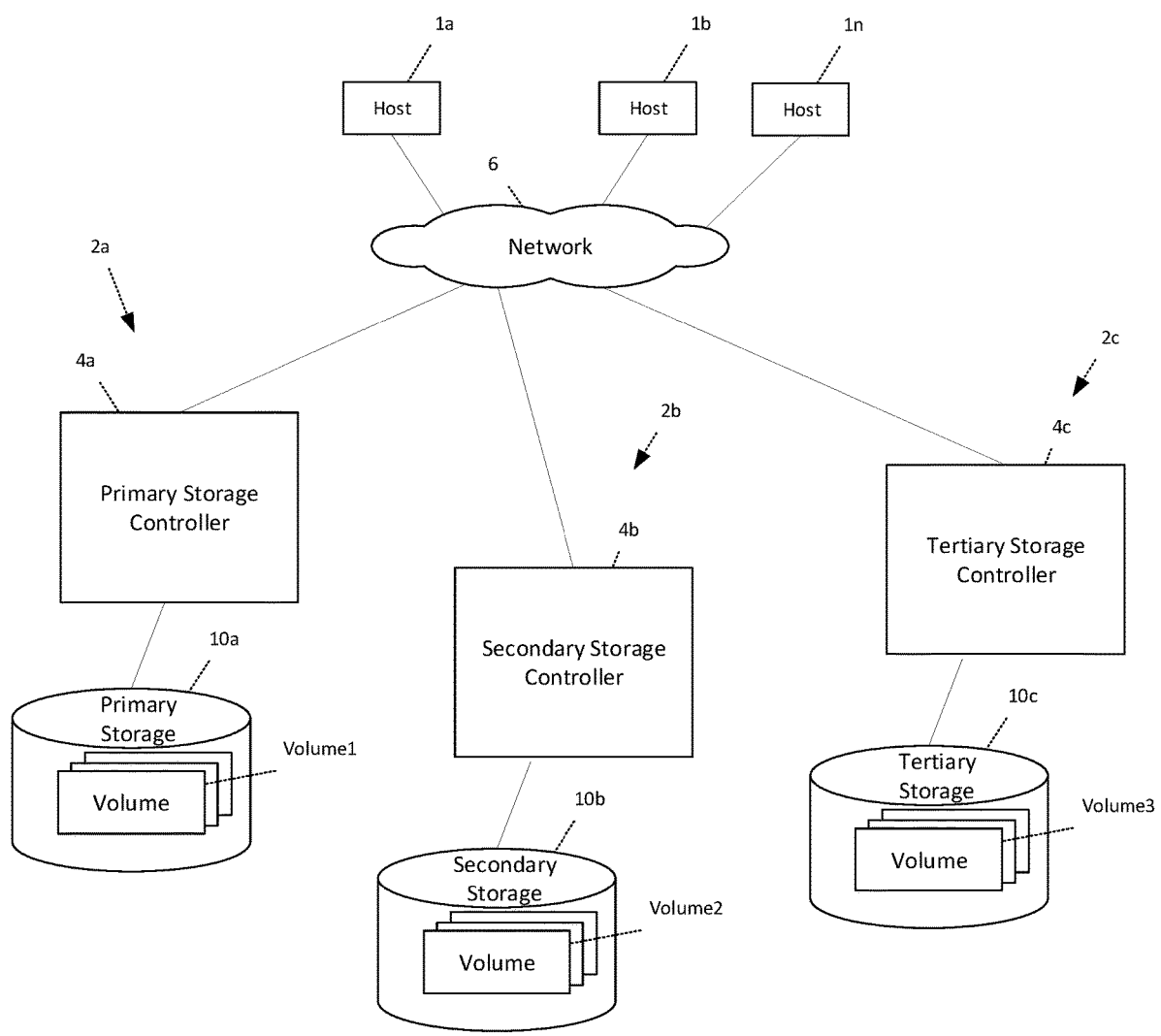
FIG. 1 illustrates an embodiment of a computing environment employing synchronized primary-secondary role swaps with synchronized safe data commit scans in multiple data storage systems in accordance with one aspect of the present description.

As noted above, an operator of a previous distributed data storage system prior to performing a primary-secondary role swap, may experience multiple slow downs in response times of input/output operations as safe data commit scan operations are being performed by the various individual data storage systems of the distributed data storage system. Moreover, safe data commit operations being performed in multiple data storage systems of a distributed data storage system can adversely affect a primary-secondary role swap in the distributed data storage system if safe data commit scan operations of data storage systems affected by the swap are not completed prior to initiation of the swap.

It is appreciated herein that in many such prior distributed data storage systems, the timers employed by each individual data storage system of the distributed data storage system to initiate safe data commit scan operations are typically independent of each other in the various individual data storage systems. For example, in a prior distributed data storage system having three individual data storage systems such as a primary, secondary and tertiary data storage system for example, there may be as many as three different and distinct times an operator of the distributed data storage system experiences a slow down in I/O response times due to three separate safe data commit scans being independently conducted at three different and distinct times in each of the data storage systems. Such independently timed safe data commit scan operations may also be more difficult to confirm whether or not they have been completed prior to initiating a primary-secondary role swap.

In one aspect of the present description, safe data commit scan operations of individual data storage systems of a distributed data storage system may be synchronized with each other and with a primary-secondary role swap operation to reduce the occurrences of reductions in I/O response times prior to the swap, and to facilitate confirmation that safe data commit scan operations of data storage systems affected by the swap are completed prior to initiation of the swap. In one embodiment, prior to initiating a planned primary-secondary role swap, a set of safe data commit scan operations of the individual data storage systems of a distributed data storage system are synchronously timed to substantially overlap in time within a single synchronized safe data commit scan set interval to reduce or eliminate the occurrences of reductions in input/output response times outside the synchronized safe data commit scan set interval. In addition, prior to initiating the planned swap, messages are received confirming completion of the set of safe data commit scan operations of data storage systems affected by the primary-secondary role swap.

For example, in one embodiment, upon initiating a safe data commit scan operation in a data storage system such as a primary data storage system, the primary data storage system may send a start safe data commit scan operation message to another data storage system such as a secondary data storage system. In response to the start safe data commit scan operation message, the secondary data storage system initiates its own safe data commit scan operation. This process may be repeated by the secondary data storage system, sending a start safe data commit scan operation message to another data storage system such as a tertiary data storage system which, in response initiates its own safe data commit scan operation. In this manner, a set of safe data commit scan operations of various individual storage systems of a distributed data storage system may be synchronized to reduce the occurrences of slow downs in response times of I/O operations of the distributed data storage system.

In another aspect of the present description, upon completing the safe data commit scan operation in the primary data storage system, the primary data storage system may start a global timer timing a global synchronizing timer interval for another set of synchronized safe data commit scan operations. In response to expiration of the global synchronizing timer interval in the primary data storage system, the primary data storage system may initiate another synchronized set of safe data commit scan operations by sending another start safe data commit scan operation message to the secondary data storage system which in turn sends another start safe data commit scan operation message to the tertiary data storage system. In this manner, another set of safe data commit scan operations of various individual storage systems of a distributed data storage system may be synchronized to reduce the occurrences of slow downs in response times of I/O operations of the distributed data storage system.

In still another aspect of the present description, data storage systems such as the secondary and tertiary data storage systems may also, upon completing the safe data commit scan operation in their respective data storage systems, send a message to confirm completion of the safe data commit scan of that data storage system. Once the primary data storage system receives a message or messages confirming completion of the safe data commit scans in the affected data storage systems, the primary-secondary role swap may be initiated. In this manner, completion of the synchronized set of safe data commit scan operations is assured prior to initiating the primary-secondary role swap operation, providing an improvement in computer technology.

In another aspect, a set of safe data commit scan operations of various individual storage systems of a distributed data storage system may be synchronized by individual data storage systems either in response to receipt of a start safe data commit scan message, or in response to expiration of a synchronizing timer interval should the start safe data commit scan message not be received in a timely manner. As a result, by synchronizing each set of safe data commit scan operations of various individual storage systems of a distributed data storage system, the occurrences of slow downs in response times of I/O operations of the distributed data storage system prior to initiation of the safe data commit scan operation may be reduced or minimized, providing additional improvements in computer technology. Other aspects and advantages may be realized, depending upon the particular application.

A system of one or more computers may be configured for synchronized primary-secondary role swaps with synchronized safe data commit scans in accordance with the present description, by virtue of having software, firmware, hardware, or a combination of them installed on the system that in operation causes or cause the system to perform synchronized role swaps and safe data commit scan operations in accordance with the present description. For example, one or more computer programs may be configured to perform synchronized role swaps with synchronized safe data commit scans by virtue of including instructions that, when executed by data processing apparatus, cause the apparatus to perform the actions.

The operations described herein are performed by logic which is configured to perform the operations either automatically or substantially automatically with little or no system operator intervention, except where indicated as being performed manually. Thus, as used herein, the term "automatic" includes both fully automatic, that is operations performed by one or more hardware or software controlled machines with no human intervention such as user inputs to a graphical user selection interface. As used herein, the term "automatic" further includes predominantly automatic, that is, most of the operations (such as greater than 50%, for example) are performed by one or more hardware or software controlled machines with no human intervention such as user inputs to a graphical user selection interface, and the remainder of the operations (less than 50%, for example) are performed manually, that is, the manual operations are performed by one or more hardware or software controlled machines with human intervention such as user inputs to a graphical user selection interface to direct the performance of the operations.

Many of the functional elements described in this specification have been labeled as "logic," in order to more particularly emphasize their implementation independence. For example, a logic element may be implemented as a hardware circuit comprising custom VLSI circuits or gate arrays, off-the-shelf semiconductors such as logic chips, transistors, or other discrete components. A logic element may also be implemented in programmable hardware devices such as field programmable gate arrays, programmable array logic, programmable logic devices or the like.

A logic element may also be implemented in software for execution by various types of processors. A logic element which includes executable code may, for instance, comprise one or more physical or logical blocks of computer instructions which may, for instance, be organized as an object, procedure, or function. Nevertheless, the executables of an identified logic element need not be physically located together, but may comprise disparate instructions stored in different locations which, when joined logically together, comprise the logic element and achieve the stated purpose for the logic element.

Indeed, executable code for a logic element may be a single instruction, or many instructions, and may even be distributed over several different code segments, among different programs, among different processors, and across several memory devices. Similarly, operational data may be identified and illustrated herein within logic elements, and may be embodied in any suitable form and organized within any suitable type of data structure. The operational data may be collected as a single data set, or may be distributed over different locations including over different storage devices.

Figure 2:
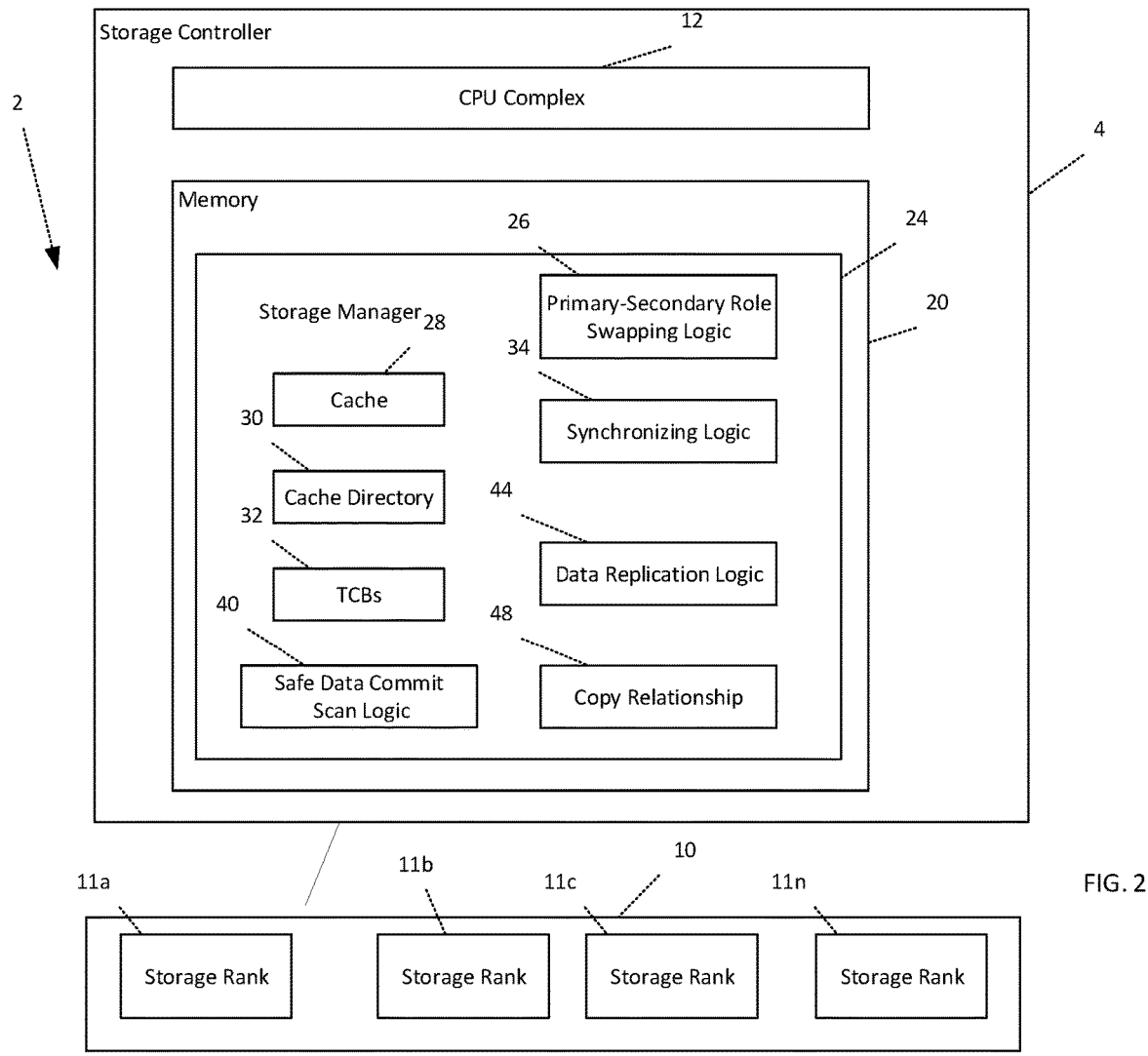
FIG. 2 illustrates an example of a data storage system in the computing environment of FIG. 1, in which the data storage system has a storage manager employing synchronized primary-secondary role swaps with synchronized safe data commit scans in accordance with one aspect of the present description.

Implementations of the described techniques may include hardware, a method or process, or computer software on a computer-accessible medium. FIGS. 1, 2 illustrate an embodiment of a computing environment employing synchronized primary-secondary role swaps with synchronized safe data commit scans in accordance with the present description. A plurality of hosts 1*a*, 1*b* . . . 1*n* may submit Input/Output (I/O) requests over a network 6 to one or more data storage devices or systems 2*a*, 2*b*, 2*c*, 2 (FIG. 2) to read or write data. The hosts 1*a*, 1*b* . . . 1*n* may be separate physical devices or may be virtual devices implemented using assigned resources of partitions of a server, for example. In a similar manner, the data storage system or systems 2 (FIG. 2), 2*a*, 2*b*, 2*c* may be separate physical devices or may be virtual devices implemented using assigned resources of partitions one or more servers, for example.

In the illustrated embodiment, the data storage system 2*a* is identified at least initially as a primary data storage system and the data storage system 2*b* is identified at least initially as a secondary data storage system in which data stored on the primary data storage system 2*a* by a host is mirrored to the secondary data storage system 2*b*. Although the embodiment depicted in FIG. 1 depicts a single secondary data storage system 2*b*, it is appreciated that a primary data storage system 2*a* may have more than one secondary data storage system. A third data storage system 2*c* is identified at least initially as a tertiary data storage system in which data mirrored to the secondary data storage system 2*b* is in turn mirrored to the tertiary data storage system 2*c*.

Each data storage system 2 (FIG. 2), 2*a*, 2*b*, 2*c* includes a storage controller or control unit 4 (FIG. 2), 4*a*, 4*b*, 4*c*, respectively, which accesses data stored in a plurality of data storage units of storage 10, 10a, 10b, 10c respectively. Each data storage unit of the storage 10, 10a, 10b, 10c may comprise any suitable device capable of storing data, such as physical hard disks, solid state drives, etc., known in the art. Thus, in one embodiment, the storage 10, 10a, 10b, 10c may be comprised of one or more sequential access storage devices, such as hard disk drives and magnetic tape or may include non-sequential access storage devices such as solid state drives (SSD), for example. Each device of storage 10 (FIG. 2), 10a, 10b, 10c may comprise a single sequential or non-sequential access device for data storage or may comprise an array of devices for data storage, such as a Just a Bunch of Disks (JBOD), Direct Access Storage Device (DASD), Redundant Array of Independent Disks (RAID) array, virtualization device, tape storage, flash memory, etc.

In certain embodiments, for example, storage units may be disks that are configured as a Redundant Array of Independent Disk (RAID) storage ranks or arrays 11a (FIG. 2), . . . 11n, in which one or more RAID storage rank is an array of hard disks in a RAID configuration to facilitate data recovery in the event of loss of a hard disk. The storage units of the storage 10, 10a, 10b, 10c may also include other types of storage such as solid state drives in a RAID configuration to facilitate data recovery in the event of loss of a solid state drive. The storage units of the storage 10 (FIG. 2), 10a, 10b, 10c may be configured to store data in subunits of data storage such as volumes, tracks, etc.

Each storage controller 4 (FIG. 2), 4a, 4b, 4c includes a CPU complex 12 (FIG. 2) including processor resources provided by one or more processors or central processing units, each having a single or multiple processor cores. In this embodiment, a processor core contains the components of a CPU involved in executing instructions, such as an arithmetic logic unit (ALU), floating point unit (FPU), and/or various levels of cache (such as L1 and L2 cache), for example. It is appreciated that a processor core may have other logic elements in addition to or instead of those mentioned herein.

Each storage controller 4 (FIG. 2), 4a, 4b, 4c further has a memory 20 that includes a storage manager 24 for managing storage operations including writing data to or reading data from an associated storage 10 (FIG. 2), 10a, 10b, 10c in response to an I/O data request from a host or mirrored data from another data storage system. The storage manager 24 of each data storage system 2a, 2b, 2c includes primary-secondary role swapping logic 26 which is configured to swap the primary-secondary roles of a primary data storage system such as the primary data storage system 2a and a secondary data storage system such as the secondary data storage system 2b. Hence, upon successful conclusion of a primary-secondary role swap, the data storage system 2b originally configured as a secondary data storage system, is reconfigured as a primary data storage system. Conversely, the data storage system 2a originally configured as a primary data storage system, is reconfigured as a secondary data storage system with respect to the new primary data storage system, that is, the data storage system 2b following the primary-secondary role swap.

A cache 28 of the memory 20 may comprise one or more of different types of memory, such as RAMs, write caches, read caches, NVS, etc. The different types of memory that comprise the cache may interoperate with each other. The CPU complex 12 of each storage controller 4 (FIG. 2), 4a, 4b, 4c may have multiple clusters of processors, each cluster having its own assigned memory 20, storage manager 24, cache 28, etc. The processing and memory resources assigned each cluster may be physical, virtual, shared, transferable or dedicated, depending upon the particular application.

Writes from the hosts 1a . . . 1n may initially be written to a cache 28 of the primary storage controller 4a and then later destaged to the storage 10a of the primary storage system 2a. Read requests from the hosts 1a . . . 1n may be satisfied from a cache 28 of the primary storage controller 4a if the corresponding information is available in that cache 28, otherwise the information is staged from the storage 10a to the cache 28 and then provided to the requesting host 1a . . . 1n.

Writes from the hosts 1a . . . 1n initially written to the cache 28 and the storage 10a of the primary storage controller 4a, may be mirrored by a storage manager 24 of the primary storage controller 4a to the secondary storage controller 4b. Mirrored data may initially be written to a cache 28 of the secondary storage controller 4b and then later destaged to the storage 10b controlled by the secondary storage controller 4b of the secondary storage system 2b. Data mirrored to the cache 28 and the storage 10b of the secondary storage controller 4b, may be mirrored by a storage manager 24 of the secondary storage controller 4b to the tertiary storage controller 4c. Mirrored data may initially be written to a cache 28 of the tertiary storage controller 4c and then later destaged to the storage 10c controlled by the tertiary storage controller 4c of the tertiary data storage system 2c.

The memory 20 of the storage controller 4 (FIG. 2), 4a, 4b, 4c includes a cache directory 30 which identifies tracks having data stored in the cache 28 as a result of a prestage or stage operation which transfers the data of a track stored in the storage 10 (FIG. 2), 10a, 10b, 10c to the cache 28, or as a result of a host or mirror write operation which writes data to the cache 28 for subsequent destaging to the corresponding track or tracks of the storage 10 (FIG. 2), 10a, 10b, 10c. In the illustrated embodiment, the cache directory 30 is implemented in the form of a known data structure which is a hash table of all tracks in cache 28. Each track is hashed into a slot of the cache directory 30 which includes a track identification (ID) and an indication as to whether the data of the track is "dirty", that is, has not yet been safely destaged to the corresponding track of the storage 10 (FIG. 2), 10a, 10b, 10c. Multiple tracks hashed into a slot are linked together. It is appreciated that a suitable cache directory may be implemented using other types of data structures.

Operations including I/O operations of the storage manager 24, including cache write, stage, prestage and destage operations, for example, utilize Task Control Blocks (TCBs) 32 of the memory 20 in the illustrated embodiment. Each TCB is a data structure in the operating system kernel containing the information needed to manage a particular process. Storage controllers may move information to and from storage, and to and from the cache by using TCBs to manage the movement of data. When a write request issues from a host to a storage controller or data is mirrored from the primary data storage system to a secondary data storage system, a TCB may be allocated from the operating system code. The TCB is used to maintain information about the write process from beginning to end as data to be written is passed from the source through the cache to the storage. If the cache is full, the TCB may be queued until existing data in the cache can be destaged (i.e., written to storage), in order to free up space.

In one aspect of the present description, the storage manager 24 includes synchronizing logic 34 which is configured to automatically synchronize primary-secondary role swaps with synchronized multiple safe data commit scan operations being performed in multiple data storage systems including a first data storage system 2a configured as a primary data storage system, a second data storage system 2b configured as a secondary data storage system, and a third data storage system 2c configured as a tertiary data storage system. The storage manager 24 of each data storage system 2a, 2b, 2c includes safe data commit logic 40 which scans the cache directory 30 of the associated data storage system for dirty data to be destaged to the associated storage 10a, 10b, 10c, respectively (FIG. 1). The safe data commit process permits an operator to be assured that anything written to cache 28 of the associated data storage system prior to the safe data commit scan start time has been successfully destaged and safely stored on the storage 10a, 10b, 10c of the associated data storage system.

The storage manager 24 further includes data replication logic 44 (FIG. 2) of the storage manager 24 which is configured to synchronously generate copies of the primary volume1 (FIG. 1) of the primary data storage system 2a as a secondary volume2 (FIG. 1) of the secondary data storage systems as represented by the secondary data storage system 2b. A primary-secondary pair of volumes, volume1, volume2 are in a synchronous copy or mirror relationship 48 such that updates to the primary volume1 are synchronously mirrored to each secondary volume2. It is appreciated that a primary-secondary pair of volumes, volume1, volume2 may alternatively be in an asynchronous copy or mirror relationship 48 such that updates to the primary volume1 are asynchronously mirrored to each secondary volume2.

In the configuration illustrated in FIG. 1, the storage controller 4a and the data storage drive 10a have been configured as a primary storage control unit and the primary storage, respectively, of a primary data storage system 2a. Similarly, the storage controller 4b and its data storage drive 10b have been configured as a secondary storage control unit and a secondary storage, respectively, of a secondary data storage system 2b. Hence, in the configuration depicted in FIG. 1, the storage controller 4a will be referred to as a primary storage controller or control unit 4a, and the data storage drive 10a will be referred to as a primary storage drive 10a. Similarly, the storage controller or control unit 4b will be referred to as a secondary storage controller or control unit 4b and the data storage drive 10b will be referred to as a secondary data storage drive 10b. In this embodiment, there may be multiple secondary data storages such that a copy relation can be in a one to many relationship, which is also referred to as a multi-target relationship.

In a particular copy relationship, the source unit is often referred to as the primary and the target unit is often referred to as the secondary. Replication relationships are defined between storage units of the primary data storage drive 10a and the secondary data storage drives 10b. Notwithstanding a reference to the data storage drive 10a as "primary" and the data storage 10b as "secondary," particular storage units of the data storages 10a, 10b, may play both a primary (or source role) and a secondary (or target role) depending upon the particular copy relationship.

The primary storage controller 4a is located at a first site and the secondary storage controller 4b is located at a second site which may be geographically or functionally remote from the first site. Thus, in this example, the first site may be at a local site and the second site may be at geographically remote sites separated by a short or long geographical distance from the local site and from each other. Alternatively, the local and remote site may be relatively close such as in different buildings in the same general geographical location, in different rooms of the same building, in different machines in the same room, or in different portions or partitions of the same machine, of the network 6.

In a similar manner, the storage manager 24 of the secondary data storage system 2b has data replication logic 44 (FIG. 2) which is configured to synchronously generate copies of the primary volume2 (FIG. 1) of the secondary data storage system 2b as a tertiary volume3 (FIG. 1) of the tertiary data storage system as represented by the tertiary data storage system 2c. A primary-secondary pair of volumes, volume2, volume3 are in a synchronous copy or mirror relationship 48 such that updates to the volume2 are synchronously mirrored to the tertiary volume3. It is appreciated that synchronized primary-secondary role swaps with synchronized safe data commit scans in accordance with present description may be employed in asynchronous data storage systems as well.

In one embodiment, the storage devices 10, 10a, 10b, 10c may be comprised of one or more sequential access storage devices, such as hard disk drives and magnetic tape or may include non-sequential access storage devices such as solid state drives (SSD), for example. Each storage device 10, 10a, 10b, 10c may comprise a single sequential or non-sequential access storage device or may comprise an array of storage devices, such as a Just a Bunch of Disks (JBOD), Direct Access Storage Device (DASD), Redundant Array of Independent Disks (RAID) array, virtualization device, tape storage, flash memory, etc.

In the illustrated embodiment, the storage manager 24 including the primary-secondary role swapping logic 26, synchronizing logic 34, and safe data commit scan logic 40 is depicted as software stored in the memory 20 and executed by the CPU complex 12. However, it is appreciated that the logic functions of the storage manager 24 may be implemented as hardware, software, firmware or combinations of one or more thereof, depending upon the particular application.

The storage manager 24 (FIG. 2) in one embodiment may store data in the cache 28 and transfer data between the cache 28 and storage 10 (FIG. 2), 10a, 10b, 10c (FIG. 1) in tracks. In writing a track to cache, a TCB allocates one or more segments of cache storage to write the track. Similarly, the storage manager 24 (FIG. 2) in one embodiment may transfer data from the primary storage drive 10a (FIG. a) to a secondary storage drive 10b in tracks or from the secondary storage drive 10b to the tertiary storage drive 10c in tracks.

As used herein, the term track may refer to a subunit of data or storage of a disk storage unit, a solid state storage unit or other types of storage units. In addition to tracks, storage units may have other subunits of storage or data such as a bit, byte, word, segment, page, block (such as a Logical Block Address (LBA)), cylinder, segment, extent, volume, logical device, etc. or any portion thereof, or other subunits suitable for transfer or storage. Thus, as used herein, a segment is a subunit of a track. Accordingly, the size of subunits of data processed in cache write and safe data commit processes in accordance with the present description may vary, depending upon the particular application. Thus, as used herein, the term "track" or the term "segment" refers to any suitable subunit of data storage or transfer.

The system components 1a (FIG. 1), 1b . . . 1n, 4 (FIG. 2), 4a (FIG. 1), 4b, 4c are connected to a network 6 which enables communication among these components. Thus, the network includes a fabric which may comprise a Storage Area Network (SAN), Local Area Network (LAN), Intranet, the Internet, Wide Area Network (WAN), peer-to-peer network, wireless network, arbitrated loop network, etc. Communication paths from the storage subsystems to the hosts 1a, 1b, . . . 1n may be based upon a particular host attachment protocol such as Fibre Connection (FICON), for example. Other communication paths of the fabric may comprise for example, a Fibre Channel arbitrated loop configuration, a serial loop architecture or a bus interface, such as a Peripheral Component Interconnect (PCI) interface such as a PCI-Express interface. The communication paths of the fabric may also be part of an Ethernet network, for example, such that each node has an individual network (internet protocol) address. Other types of communication paths may be utilized, such as a modem telephone path, wireless network, etc., depending upon the particular application.

Communication software associated with the communication paths includes instructions and other software controlling communication protocols and the operation of the communication hardware in accordance with the communication protocols, if any. It is appreciated that other communication path protocols may be utilized, depending upon the particular application.

Figure 3:
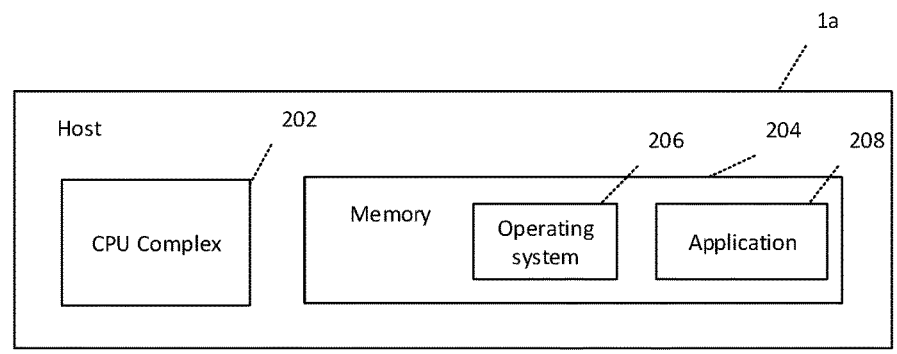
FIG. 3 illustrates an example of a host in the computing environment of FIG. 1.

A typical host as represented by the host 1a of FIG. 3 includes a CPU complex 202 and a memory 204 having an operating system 206 and an application 208 that cooperate to read data from and write data updates to the storage 10 (FIG. 2), 10a, 10b, 10c via a storage controller 4, 4a, 4b, 4c. An example of a suitable operating system is the z/OS operating system. It is appreciated that other types of operating systems may be employed, depending upon the particular application.

Figure 4:
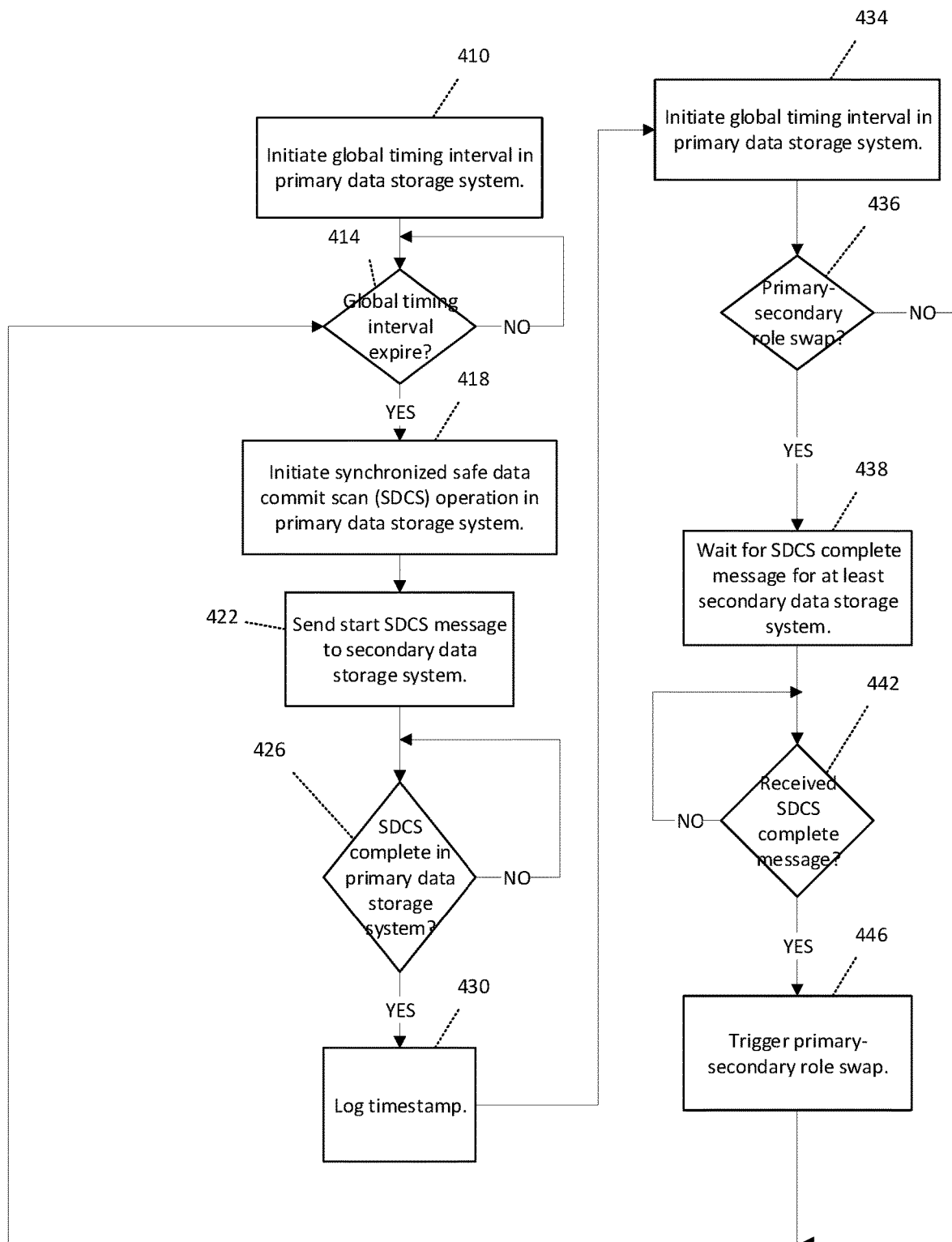
FIG. 4 illustrates an example of operations of a primary data storage system of a distributed data storage system employing synchronized primary-secondary role swaps with synchronized safe data commit scans in accordance with one aspect of the present description.

FIG. 4 depicts one example of automatic operations of synchronizing logic 34 (FIG. 2) of a primary data storage system in the synchronizing of a primary-secondary role swap with a synchronized set of safe data commit scan operations of safe data commit scan logic 40 in each of multiple data storage systems to ensure that the set of safe data commit scan operations are completed prior to initiation of the role swap operation. In one embodiment, the data storage system performing the primary-secondary role swap operation waits for receipt of a message or messages notifying that data storage system of completion of the safe data commit scan operations in other data storage systems which will be affected by the role swap operation.

The synchronizing logic 34 also ensures that the set of safe data commit scan operations occur substantially at the same time and substantially in a single synchronized set interval so as to improve the overall performance of the data storage system prior to initiation of the role swap operation. For example, because the set of safe data commit scan operations occur substantially at the same time, and substantially in a single synchronized set interval, any resultant reduction in I/O response times due to the set of safe data commit scan operations also occurs substantially in the same interval of time, reducing or eliminating the impact of the set of safe data commit scan operations outside the interval and prior to initiation of the role swap operation. The operations of the primary data storage system 2a depicted in FIG. 4 are synchronized and concurrent with and operate in parallel with those of secondary and tertiary data storage systems 2b and 2c, respectively, depicted in FIGS. 6 and 7, respectively.

Figure 5A:
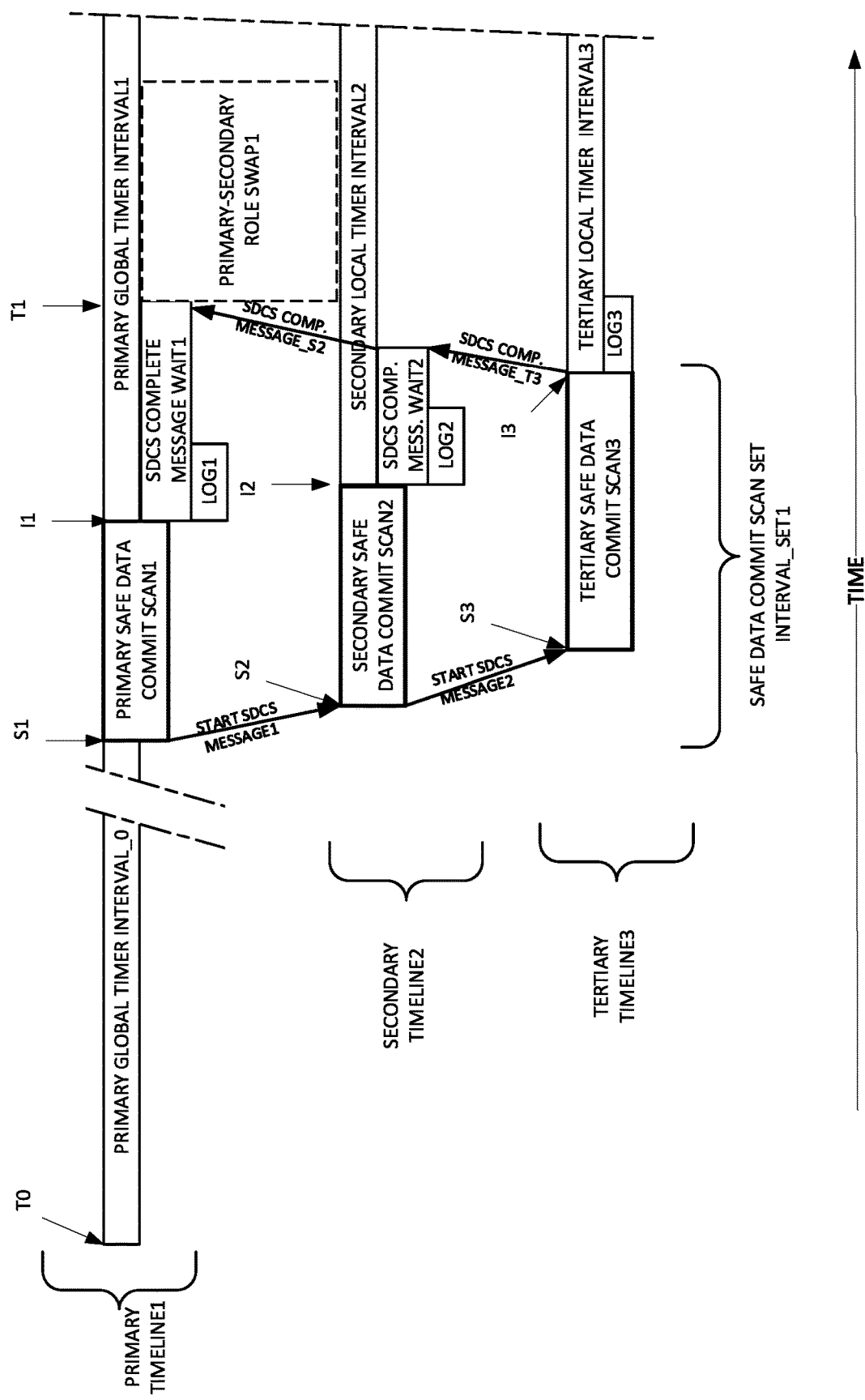
FIGS. 5A, 5B and 5B' depict examples of timelines of operations of primary, secondary and tertiary data storage systems of a distributed data storage system employing synchronized primary-secondary role swaps with synchronized safe data commit scans in accordance with one aspect of the present description.

FIG. 5A depicts an example of a first primary-secondary role swap operation, swap1, which is synchronized with a first set of synchronized safe data commit scan operations, primary safe data commit scan1, secondary safe data commit scan2, and tertiary safe data commit scan3, being conducted by safe data commit scan logic 40 in each of the data storage systems of a distributed data storage system, that is, primary data storage system 2a (FIG. 1), secondary data storage system 2b, and the tertiary data storage system 2c, respectively. The primary-secondary role swap operation, swap1, is initiated in this example by the primary data storage system 2a after the primary data storage system 2a receives notification that the synchronized safe data commit scan operations, scan1, scan2 and scan3 have been completed. Each safe data commit scan operation, scan1 (FIG. 5A), scan2, scan3, destages data cached in a cache 28 (FIG. 2) of the associated data storage system 2a (FIG. 1), 2b, 2c, respectively, to a data storage unit 10a, 10b, 10c, respectively of the associated data storage system 2a, 2b, 2c, respectively.

Figure 5B:
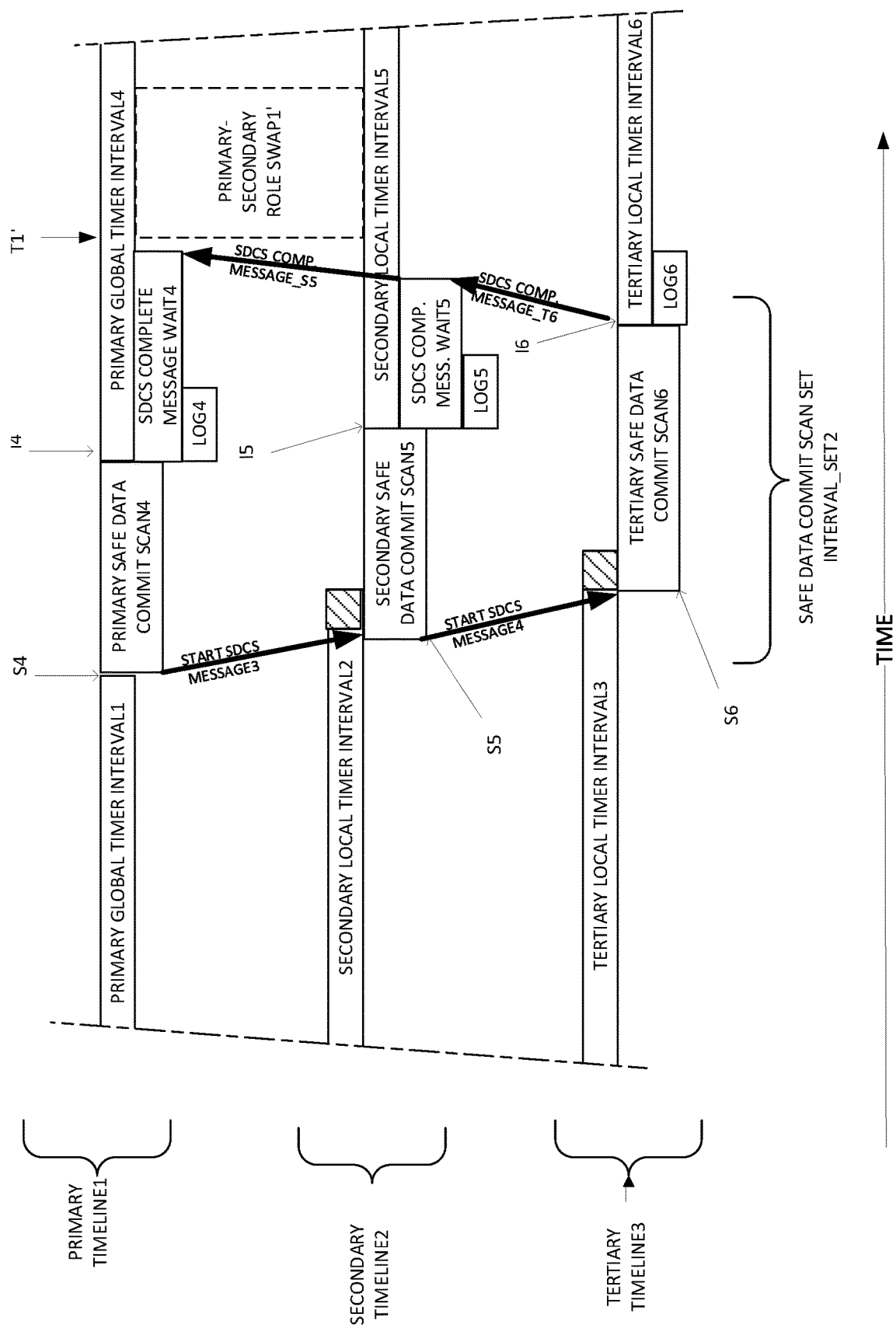
Figure 5B:
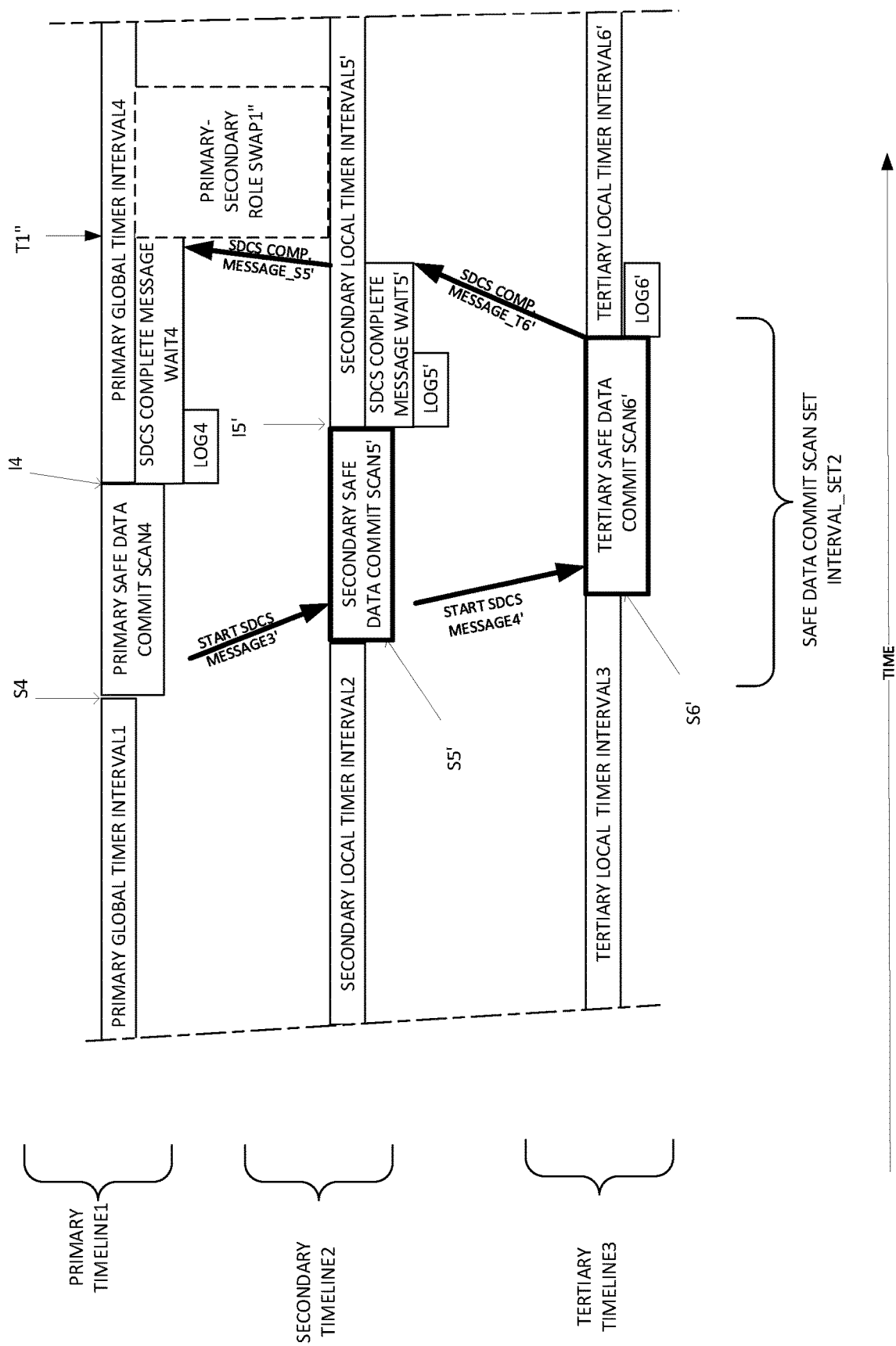

FIGS. 5A, 5B depict the automatic operations of the synchronizing logic 34 and the safe data commit scan logic 40 in each data storage system 2a, 2b, 2c, in three horizontal timelines, primary timeline1, secondary timeline2, tertiary timeline3, respectively, oriented parallel to a horizontal time axis "TIME." As indicated in FIG. 5A, the first set of safe data commit scan operations, scan1, scan2, scan3, are synchronously timed to substantially overlap in the timelines within a single synchronized safe data commit scan set interval_SET1 to reduce or eliminate the occurrences of reductions in input/output response times outside the synchronized safe data commit scan set interval_SET1 which are caused by safe data commit scan operations in the data storage systems 2a, 2b, 2c prior to initiation of the role swap operation, swap1. By comparison in prior data storage systems, each of the primary, secondary and tertiary data storage systems typically initiated safe data commit scans independently with non-synchronized, independent timers. As a result, prior to initiating a primary-secondary role swap, degradations in response time of data replication operations may occur independently at multiple non-overlapping intervals in connection with each non-synchronized, non-overlapping safe data commit scan operation of the various data storage systems of the distributed data storage system. Thus, the operator of the previous system may experience multiple distinct spikes in response time prior to the primary-secondary role swap due to the multiple, non-synchronized safe data commit scan operations. Moreover, ensuring that the safe data commit scans have been completed prior to initiating the primary-secondary role swap, in each data storage system affected by the role swap, may be adversely affected by the occurrences of multiple, non-synchronized safe data commit scan operations.

In the example of FIG. 5A, the synchronizing logic 34 of the primary data storage system 2a is configured to initiate (block 410, FIG. 4) a synchronizing timer interval prior to initiating the primary-secondary role swap1 in the primary data storage system. For example, FIG. 5A depicts a primary synchronizing timer interval_0 initiated at a time T0 in the primary timeline1 of the primary data storage system 2a (FIG. 1). In one embodiment, the timer interval_0, also referred to herein as a global synchronizing timer interval, may be set for an hour, for example. It is appreciated that other durations may be selected, depending upon the particular application. For example, in anticipation of a planned primary-secondary role swap operation, the timer interval_0 may be set for a relatively short period of time such as a few minutes, for example. Synchronized primary-secondary role swap operations with synchronized safe data commit scan operations in accordance with the present description may also be applied to unplanned role swap operations, such as if there is sufficient time for the synchronized safe data commit scan operations to complete prior to initiation of the primary-secondary role swap operation. As described in greater detail below, the synchronizing timer intervals of the primary data storage system are referred to herein as "global" because they can affect the timing of all safe data commit scan operations of each set of safe data commit scan operations.

Upon expiration (block 414, FIG. 4) of the global synchronizing timer interval_0 (FIG. 5A), the synchronizing logic 34 of the primary data storage system 2a is configured to initiate (block 418, FIG. 5A) in the primary data storage system, a safe data commit scan (SDCS) operation in the primary timeline1. In the example of FIG. 5A, the safe data commit scan operation, scan1, of the first set of SDCS operations, is initiated at time S1 in the primary data storage system 2a (FIG. 1), which marks the beginning of the synchronized safe data commit scan set interval_SET1 for the first set of SDCS operations. The safe data commit scan (SDCS) operation, scan1, is performed by the safe data commit scan logic 40 of the primary data storage system in response to the initiation (block 418, FIG. 4) provided by the synchronizing logic 34 of the primary data storage system 2a.

At or about the same time S1 that the synchronizing logic 34 of the primary data storage system 2a initiates (block 418, FIG. 5A) a safe data commit scan (SDCS) operation in the primary data storage system 2a, the synchronizing logic 34 of the primary data storage system 2a is further configured to send (block 422, FIG. 4) a start safe data commit scan (SDCS) message to the secondary data storage system. In the example of FIG. 5A, the "start SDCS message1" is sent at time S1 to the secondary data storage system 2b (FIG. 1).

As explained in greater detail below in connection with FIG. 6, the secondary data storage system 2b uses the start SDCS message1 from the primary data storage system to synchronously initiate a safe data commit scan operation in the secondary data storage system 2b with the concurrent and parallel safe data commit scan operation (primary safe data commit scan1) in the primary data storage system 2a. As a result, both safe data commit scan operations, scan1 and scan2, occur within the single synchronized safe data commit scan set interval_SET1 for the first set of safe data commit scan operations. In a similar manner, as explained in greater detail below in connection with FIG. 7, the secondary data storage system 2b also sends a start SDCS message, start SDCS message2, to the tertiary data storage system which uses the start SDCS message2 from the secondary data storage system to synchronously initiate a safe data commit scan operation in the tertiary data storage system 2c with concurrent and parallel safe data commit scan operations (primary safe data commit scan1 and secondary safe data commit scan2) in the primary data storage system 2a and the secondary data storage system 2b, respectively. As a result, all three synchronized safe data commit scan operations, scan1, scan2, and scan3 of the first set of SDCS operations, occur within the single synchronized safe data commit scan set interval_SET1 for the first set of safe data commit scan operations.

Figure 6:
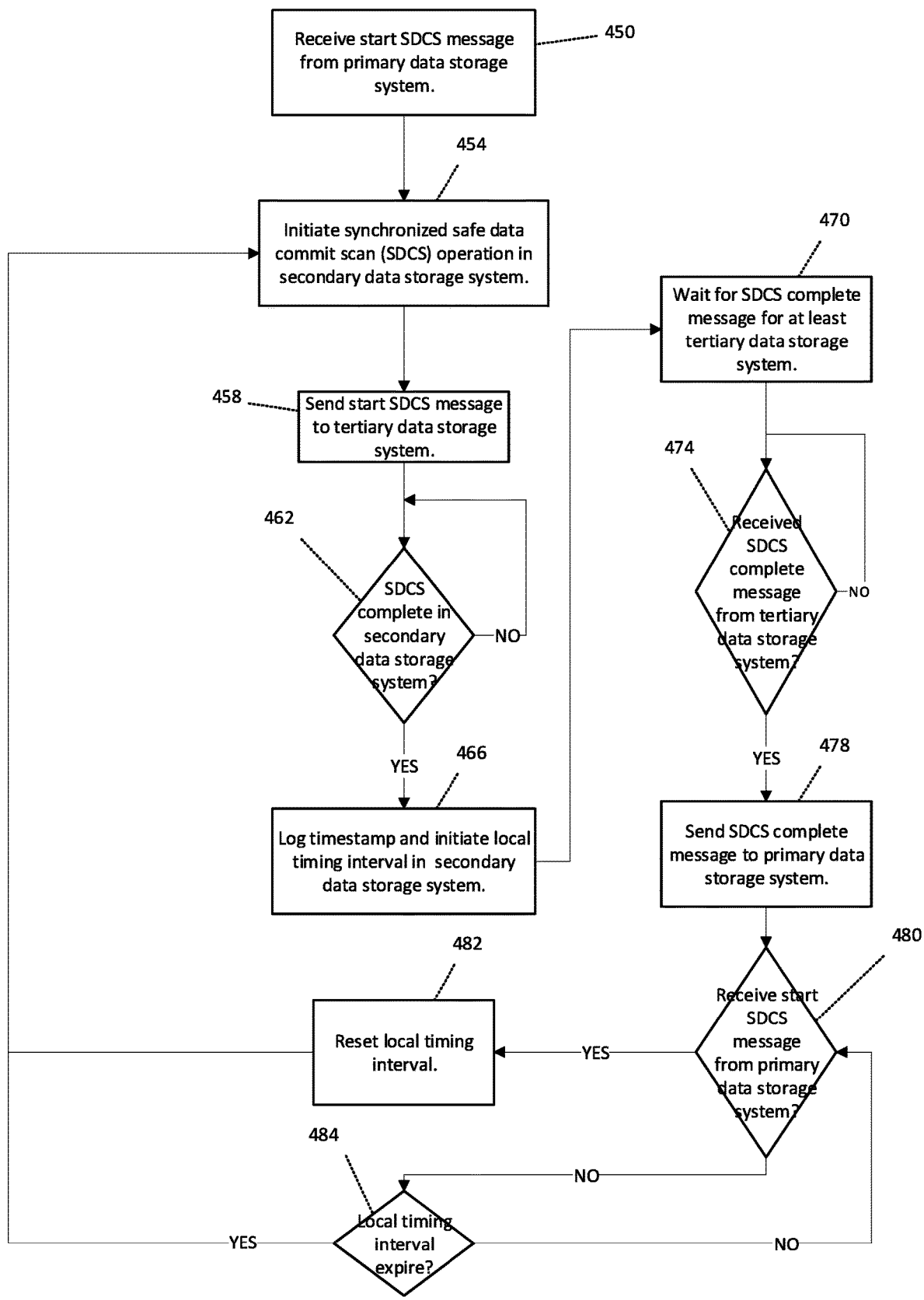
FIG. 6 illustrates an example of operations of a secondary data storage system of a distributed data storage system employing synchronized primary-secondary role swaps with synchronized safe data commit scans in accordance with one aspect of the present description.
Figure 7:
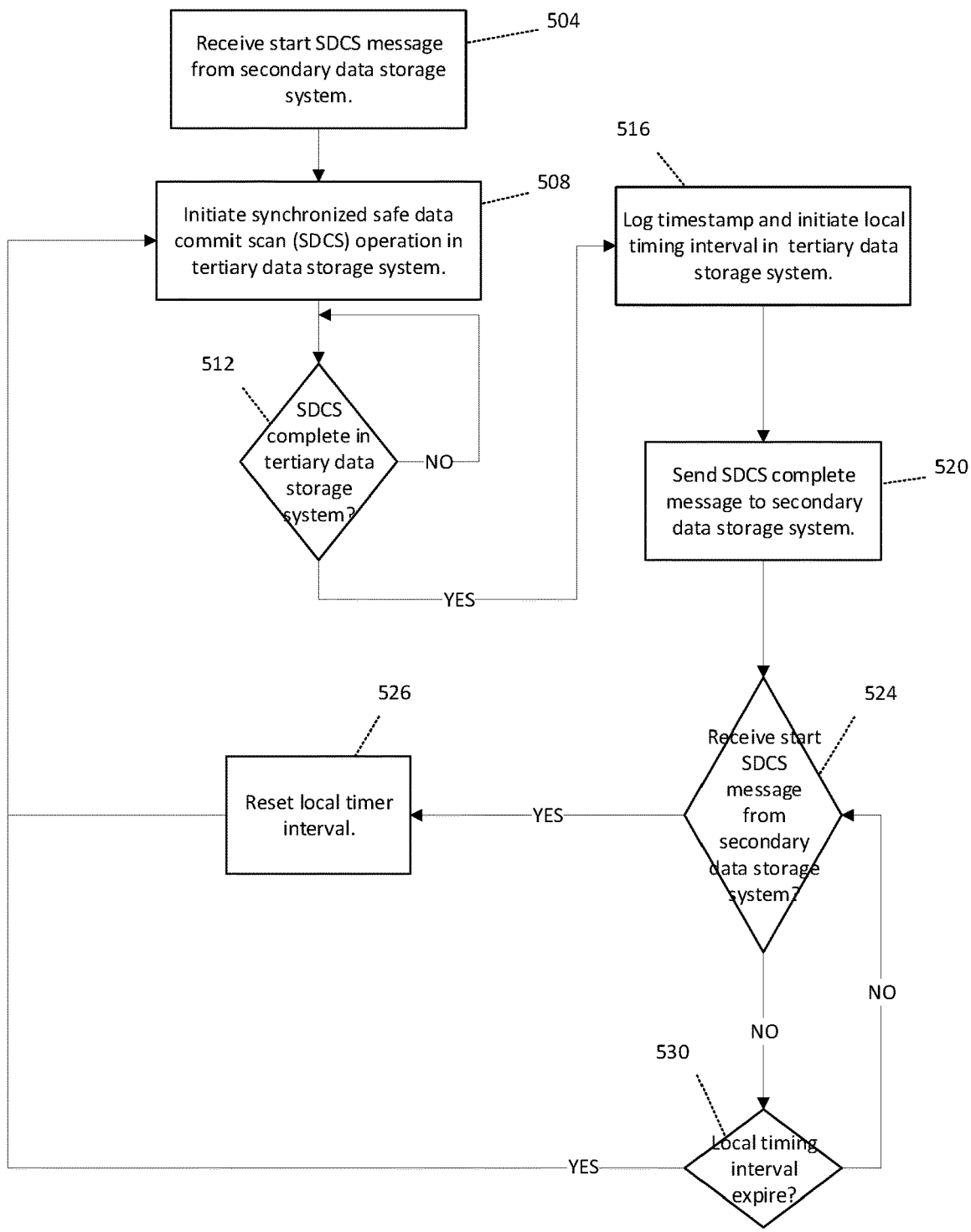
FIG. 7 illustrates an example of operations of a tertiary data storage system of a distributed data storage system employing synchronized primary-secondary role swaps with synchronized safe data commit scans in accordance with one aspect of the present description.

Before turning to the automatic operations of the synchronizing logic 34 of the secondary data storage system 2b depicted in FIG. 6, and the automatic operations of the synchronizing logic 34 of the tertiary data storage system 2c depicted in FIG. 7, it is noted that the synchronizing logic 34 of the primary data storage system 2a is configured to determine (block 426, FIG. 4) whether the safe data commit scan operation (scan1 in this example) has completed. If so, the time of initiation, S1 (FIG. 5A) in this example, of the safe data commit scan operation scan1, is logged (block 430, FIG. 4) in a log operation Log 1 (FIG. 5A) as a timestamp in a suitable safe data commit scan log. In this example, completion of the safe data commit scan operation scan1 and the logging of the safe data commit scan start timestamp S1 permits an operator to be assured that anything written to cache 28 of the primary data storage system 2a prior to the safe data commit scan start time S1 has been successfully destaged and safely stored on the storage 10a of the primary data storage system 2a.

The synchronizing logic 34 of the primary data storage system 2a is also configured to, upon completion of the safe data commit scan operation, scan1 in this example, to initiate (block 434, FIG. 4) at a time I1 (FIG. 5A) another global synchronizing timer interval, primary global timer interval1 (FIGS. 5A, 5B) in the primary data storage system 2a. In one embodiment, the global timer interval1 may be set for the same duration as the initial global synchronzing timer interval_0, such as an hour, for example. It is appreciated that other durations may be selected, depending upon the particular application. As explained in greater detail below, upon expiration of the next global synchronizing timer interval1, the process described above repeats in the primary data storage system 2a for another set of SDCS operations.

In another aspect of the present description, the synchronizing logic 34 of the primary data storage system 2a is also configured to, determine (block 436) whether an optional primary-secondary role swap, swap1 in this example, is to be synchronized with the synchronized set of safe data commit scan operations. A primary-secondary role swap is optional in the sense that it need not be performed in connection with each and every set of synchronized safe data commit scan operations. For example, the primary-secondary role swap may be a planned role swap operation being performed in connection with other events such as maintenance of the system, for example. In other applications, the primary-secondary role swap1 may be an unplanned role swap operation should there be sufficient time to complete the synchronized set of safe data commit scan operations prior to the unplanned role swap operation.

In one embodiment, a system operator may optionally elect through a suitable user interface, to perform a planned or unplanned primary-secondary role swap operation. Accordingly, the synchronizing logic 34 of the primary data storage system 2a may be configured to, determine (block 436) whether an optional primary-secondary role swap, swap1 in this example, is to be performed in response to manual user inputs by the system operator. In other examples, the distributed data storage system may determine automatically to perform a planned or unplanned primary-secondary role swap operation. Accordingly, the synchronizing logic 34 of the primary data storage system 2a may be configured to, determine (block 436) whether an optional primary-secondary role swap has been automatically selected to be performed.

Upon completion (block 426) of the safe data commit scan operation, scan1 in this example, and in response to a determination (block 436) that an optional primary-secondary role swap is to be performed, synchronizing logic 34 of the primary data storage system 2a may be configured to wait (block 438, FIG. 4) in a wait operation, wait1, for a completion message from the secondary data storage system 2b, indicating that the safe data commit scans, scan2 and scan3, of the secondary and tertiary data storage systems 2b, 2c, respectively have been completed. As explained in greater detail below, waiting for receipt of a scan complete message facilitates synchronizing a primary-secondary role swap with completion of the set of synchronized safe data commit scan operations.

Turning now to the operations of the secondary data storage system 2b which are synchronized and concurrent with those of primary and tertiary data storage systems 2a and 2c, respectively, depicted in FIGS. 4 and 7, respectively, FIG. 6 depicts an example of automatic operations of the synchronizing logic 34 of a secondary data storage system in the synchronizing of a set of safe data commit scan operations in multiple data storage systems with an optional role swap operation. The operations of the synchronizing logic 34 of the secondary data storage system operate in parallel with those of the synchronizing logic 34 of each of the primary and tertiary data storage systems in the synchronizing of each set of safe data commit scan operations in the multiple data storage systems.

The synchronizing logic 34 of the secondary data storage system 2b is configured to receive (block 450, FIG. 6) the start safe data commit scan (SDCS) message sent (block 422, FIG. 4) by the primary data storage system to the secondary data storage system. In the example of FIG. 5A, the "start SDCS message1" is sent by the primary data storage system 2a at or about time S1 (the start of the primary safe data commit scan1) and is received by the secondary data storage system 2b (FIG. 1) at or about time S2 which is at or about the same time S1, depending upon the amount of transmission delay from the primary data storage system 2a to the secondary data storage system 2b. It is appreciated that the amount of transmission delay from the primary data storage system 2a to the secondary data storage system 2b may vary from negligible to on the order of a few seconds, for example, depending upon the geographical distance and other signal transmission factors present between the primary data storage system 2a and the secondary data storage system 2b. Longer or shorter delays may be encountered, depending upon the particular application and environment.

In response to the "start SDCS message1" received at the secondary data storage system 2b, the synchronizing logic 34 of the secondary data storage system 2b is further configured to initiate (block 454, FIG. 6) a safe data commit scan (SDCS) operation at a time S2 in this example, in the secondary timeline2 in the secondary data storage system. In the example of FIG. 5A, the SDCS operation initiated in the secondary data storage system is the secondary safe data commit scan operation, scan2 in the secondary data storage system 2b (FIG. 1). As a result, both safe data commit scan operations, scan1 and scan2, of the primary data storage system 2a and the secondary data storage system 2b, respectively, occur within the single synchronized safe data commit scan set interval_SET1 for the first set of safe data commit scan operations. The safe data commit scan (SDCS) operation, scan2, is performed by the safe data commit scan logic 40 of the secondary data storage system in response to the initiation (block 454, FIG. 6) provided by the synchronizing logic 34 of the secondary data storage system 2b.

At or about the same time S2 that the synchronizing logic 34 of the secondary data storage system 2b initiates (block 454, FIG. 5A) a safe data commit scan (SDCS) operation scan2 in the secondary data storage system 2b, the synchronizing logic 34 of the secondary data storage system 2b is further configured to send (block 458, FIG. 6) a start safe data commit scan (SDCS) message to the tertiary data storage system. In the example of FIG. 5A, the "start SDCS message2" is sent by the secondary data storage system 2b to the tertiary data storage system 2c (FIG. 1).

As explained in greater detail below in connection with FIG. 7, the tertiary data storage system 2c uses the start SDCS message2 from the secondary data storage system to synchronously initiate a safe data commit scan operation in the tertiary data storage system 2c with a concurrent and parallel safe data commit scan operation (secondary safe data commit scan2) in the secondary data storage system 2b. As set forth above, the safe data commit scan operation scan2 in the secondary data storage system 2b is also synchronized with the concurrent and parallel safe data commit scan operation (primary safe data commit scan1) in the primary data storage system 2a. As a result, the safe data commit scan operations, scan1, scan2 and scan3 of the data storage systems 2a, 2b, 2c, respectively, are synchronized to run substantially concurrently and in parallel. Thus all three synchronized safe data commit scan operations, scan1, scan2, and scan3 of the first set of SDCS operations, occur within the single synchronized safe data commit scan set interval_SET1 for the first set of safe data commit scan operations. As a result, any intervals of reduced response times due to the first set of safe data commit scan operations are also substantially concurrent and in parallel and substantially limited to the synchronized safe data commit scan set interval_SET1.

The synchronizing logic 34 of the secondary data storage system 2b is configured to determine (block 462, FIG. 6) whether the safe data commit scan operation (scan2 in this example) of the secondary data storage system 2b has completed. If so, the time of initiation, S2 (FIG. 5A) in this example, of the safe data commit scan operation scan2, is logged (block 466, FIG. 6) in a log operation Log 2 (FIG. 5A) as a timestamp in a suitable safe data commit scan log. In this example, completion of the safe data commit scan operation scan2 and the logging of the safe data commit scan start timestamp S2 permits an operator to be assured that anything written to cache 28 of the secondary data storage system 2b prior to the safe data commit scan start time S2 of the scan2 has been successfully destaged and safely stored on the storage 10b of the secondary data storage system 2b.

The synchronizing logic 34 of the secondary data storage system 2b is further configured to, upon completion of the secondary safe data commit scan2 in the secondary data storage system 2b, initiate (block 466, FIG. 6) another synchronizing timer interval, secondary local timer interval2 (FIGS. 5A, 5B) in the secondary data storage system 2b. The synchronizing timer intervals of the secondary data storage system 2b and the tertiary data storage system 2c are referred to herein as "local" rather than "global" because the effect on synchronizing timing by these synchronizing timer intervals may be more local than the global timer intervals of the primary data storage system.

The secondary local timer interval2 is initiated at a time I2 in the secondary timeline2 of the secondary data storage system 2b (FIG. 1). As explained in greater detail below, expiration of the next local synchronizing timer interval2, can permit the process described above to repeat in the secondary data storage system 2b for another set of SDCS operations notwithstanding failure of a start SDCS message to be timely received.

In one aspect of the present description, the "start SDCS message1" received at the secondary data storage system 2b from the primary data storage system 2a, includes synchronized timer interval duration parameter data. In one embodiment, the synchronized timer interval duration data packaged in the start SDCS message1 from the primary data storage system 2a defines the interval of the synchronizing primary global timer interval1 of the primary data storage system 2a. The synchronizing logic 34 of the secondary data storage system 2b is further configured to set the duration of the secondary local timer interval2 (FIGS. 5A, 5B) in the secondary data storage system 2b as a function of the synchronized timer interval duration parameter data received from the primary data storage system 2a in the start SDCS message1 from the primary data storage system 2a. Accordingly, in one embodiment, the duration of the secondary local timer interval2 (FIGS. 5A, 5B) in the secondary data storage system 2b may be set to be a small percentage (such as 10-20%, for example) or a small amount of time (such as 5-10 minutes, for example) greater than the duration of the primary global synchronizing timer interval1 (FIGS. 5A, 5B) in the primary data storage system 2a. Thus, in one embodiment, the timer interval2 may be set for a small percentage or small amount of time greater than an hour, for example. It is appreciated that other durations may be selected, depending upon the particular application.

It is further appreciated that setting the duration of the secondary synchronizing timer interval2 to approximate that of the primary synchronizing timer interval1 facilitates synchronizing the SDCS operations, scan1 and scan2 of the first set of synchronized SDCS operations to remain in a relatively time restricted safe data commit scan set interval. At the same time, it is appreciated that setting the duration of the secondary synchronizing timer interval2 to be slightly greater than that of the primary synchronizing timer interval1 facilitates synchronizing the SDCS operations of the secondary and tertiary data storage systems based upon start SDCS messages rather than the expiration of synchronizing intervals in the secondary and tertiary data storage systems as described in greater detail below.

In another aspect of the present description, the synchronizing logic 34 of the secondary data storage system 2b is also configured to, upon completion of the safe data commit scan operation, scan2 in this example, to wait (block 470, FIG. 6) in a wait operation, wait2, for a message from the tertiary data storage system 2c, indicating that the safe data commit scan, scan3, of the tertiary data storage system 2c has been completed. As explained in greater detail below, waiting for receipt of a scan complete message facilitates synchronizing a primary-secondary role swap with completion of the set of synchronized safe data commit scan operations.

Turning now to the operations of the tertiary data storage system 2c, which are synchronized and concurrent with those of primary and secondary data storage systems 2a and 2b, respectively, depicted in FIGS. 4 and 6, respectively, FIG. 7 depicts an example of automatic operations of the synchronizing logic 34 of a tertiary data storage system in the synchronizing of each set of safe data commit scan operations in multiple data storage systems with an optional role swap operation. The operations of the synchronizing logic 34 of a tertiary data storage system operate synchronously and in parallel with those of the synchronizing logic 34 of each of the primary and secondary data storage systems in the synchronizing of each set of safe data commit scan operations in the multiple data storage systems.

In a manner similar to that described above in connection with the secondary data storage system 2b, the synchronizing logic 34 of the tertiary data storage system 2c is configured to receive (block 504, FIG. 7) the start safe data commit scan (SDCS) message sent (block 458, FIG. 6) by the secondary data storage system to the tertiary data storage system. In the example of FIG. 5A, the start SDCS message2 is sent by the secondary data storage system 2b at or about time S2 and is received by the tertiary data storage system 2c (FIG. 1) at or about time S3 which is at or about the same time S2, depending upon the amount of transmission delay from the secondary data storage system 2b to the tertiary data storage system 2c. It is appreciated that the amount of transmission delay from the secondary data storage system 2b to the tertiary data storage system 2c may vary from negligible to on the order of a few seconds, for example, depending upon the geographical distance and other signal transmission factors present between the secondary data storage system 2b and the tertiary data storage system 2c. Longer or shorter delays may be encountered, depending upon the particular application and environment.

In response to the start SDCS message2 received at the tertiary data storage system 2c, the synchronizing logic 34 of the tertiary data storage system 2c is further configured to initiate (block 508, FIG. 7) a safe data commit scan (SDCS) operation at a time S3 in this example, in the tertiary timeline3 in the tertiary data storage system. In the example of FIG. 5A, the SDCS operation initiated in the tertiary data storage system is the tertiary safe data commit scan operation, scan3 in the tertiary data storage system 2c (FIG. 1). As a result, all three synchronized safe data commit scan operations, scan1, scan2, and scan3 of the primary data storage system 2a, the secondary data storage system 2b, and the tertiary data storage system 2c, respectively, occur within the single synchronized safe data commit scan set interval_SET1 for the first set of safe data commit scan operations. The safe data commit scan (SDCS) operation, scan3, is performed by the safe data commit scan logic 40 of the tertiary data storage system in response to the initiation (block 508, FIG. 7) provided by the synchronizing logic 34 of the tertiary data storage system 2c.

The synchronizing logic 34 of the tertiary data storage system 2c is configured to determine (block 512, FIG. 7) whether the safe data commit scan operation (scan3 in this example) of the tertiary data storage system 2c has completed. If so, the time of initiation, S3 (FIG. 5A) in this example, of the safe data commit scan operation scan3, is logged (block 516, FIG. 7) in a log operation Log 3 (FIG. 5A) as a timestamp in a suitable safe data commit scan log. In this example, completion of the safe data commit scan operation scan3 and the logging of the safe data commit scan start timestamp S3 permits an operator to be assured that anything written to cache 28 of the tertiary data storage system 2c prior to the safe data commit scan start time S3 of the scan3 has been successfully destaged and safely stored on the storage 10c of the tertiary data storage system 2c.

The completion of the last safe data commit scan operation the first set of safe data commit scan operations, marks the end of the synchronized safe data commit scan set interval_SET1 for the first set of safe data commit scan operations. In the example of FIG. 5A, completion of the tertiary safe data commit scan operation, scan3, of the tertiary data storage system 2c, marks the end of the synchronized safe data commit scan set interval_SET1 for the first set of safe data commit scan operations. It is appreciated that the particular safe data commit scan operation of a set of safe data commit scan operations which is last to complete may vary, depending upon the exact time of initiation and the amount of data to be destaged in each safe data commit scan operation as well as other operational conditions of the respective data storage systems. Nevertheless, the amount of overlap in time of the safe data commit operations of the set of operations may be substantially increased or maximized by synchronizing operations in accordance with the present description. Thus in this example, all three synchronized safe data commit scan operations, scan1, scan2, and scan3 of the first synchronized set of SDCS operations, substantially overlap and are parallel and substantially concurrent in time so as to occur within the single synchronized safe data commit scan set interval_SET1 for the first set of safe data commit scan operations. As a result, any intervals of reduced response times prior to initiation of a primary-secondary role swap and due to safe data commit scan operations are also substantially concurrent and substantially limited in time to the synchronized safe data commit scan set interval_SET1 to improve system performance.

The synchronizing logic 34 of the tertiary data storage system 2c is further configured to, upon completion of the tertiary safe data commit scan3 in the tertiary data storage system 2c, initiate (block 516, FIG. 7) another synchronizing timer interval, tertiary local timer interval3 (FIGS. 5A, 5B) in the tertiary data storage system 2c. The tertiary local timer interval3 is initiated at a time I3 in the tertiary timeline3 of the tertiary data storage system 2c (FIG. 1). As explained in greater detail below, expiration of the next local synchronizing timer interval3, can permit the process described above to repeat in the tertiary data storage system 2c for another set of SDCS operations notwithstanding failure of a start SDCS message to be timely received.

In another aspect of the present description, the synchronizing logic 34 of the tertiary data storage system 2c is further configured to, upon completion of the tertiary safe data commit scan3 in the tertiary data storage system 2c, to send (block 520, FIG. 7) a message, SDCS complete message_T3 in this example, to the secondary data storage system 2b, indicating completion of the tertiary safe data commit scan3 in the tertiary data storage system 2c. As set forth above, the secondary data storage system 2b waits (block 470, FIG. 6) in a wait operation, wait2, for a message, SDCS complete message_T3 in this example, from the tertiary data storage system 2c, indicating that the safe data commit scan, scan3, of the tertiary data storage system 2c has been completed.

Returning to FIG. 6, the synchronizing logic 34 of the secondary data storage system 2b is further configured to determine (block 474, FIG. 6) whether the SDCS complete message_T3 in this example, from the tertiary data storage system 2c, indicating completion of the safe data commit scan3 of the tertiary data storage system 2c, has been received. The synchronizing logic 34 of the secondary data storage system 2b is further configured to, in response to a receipt (block 474) of the SDCS complete message_T3 from the tertiary data storage system 2c, indicating completion of the tertiary SDCS scan3, and in response to completion (block 462, FIG. 6) of the secondary safe data commit scan2 in the secondary data storage system 2b, to send (block 478, FIG. 6) a message, that is, SDCS complete message_S2 (FIG. 5A) in this example, to the primary data storage system 2a, indicating completion of both the secondary safe data commit scan2 in the secondary data storage system 2b, and the tertiary safe data commit scan3 in the tertiary data storage system 2c. As set forth above, the primary data storage system 2a waits (block 438, FIG. 4) in a wait operation, wait1, for a message, SDCS complete message_S2 in this example, from the secondary data storage system 2b, indicating that the safe data commit scans, scan2 and scan3, of the secondary data storage system 2b and the tertiary data storage system 2c, respectively, have been completed.

Returning to FIG. 4, synchronizing logic 34 of the primary data storage system 2a may be configured to, in response to a determination (block 436) that an optional primary-secondary role swap is to be performed, determine (block 442, FIG. 4) whether the SDCS complete message_S2 in this example, from the secondary data storage system 2b, indicating completion of the safe data commit scans, scan2 and scan3 of the secondary data storage system 2b and the tertiary data storage system 2c, has been received. Accordingly, the synchronizing logic 34 of the primary data storage system 2a is further configured to, in response to a determination (block 442) that the SDCS complete message_S2 from the secondary data storage system 2b, has been received, to initiate (block 446, FIG. 4) at time T1 (FIG. 5A), a primary-secondary role swap, swap1 in this example, of the primary data storage system 2a and the secondary data storage system 2b if it had been determined (block 436) that an optional primary-secondary role swap is to be performed. The primary-secondary role swap operation is performed by the primary-secondary role swapping logic 26 (FIG. 2) in response to the initiation (block 446) by the synchronizing logic 34 of the primary data storage system 2a.

In this manner, completion of the synchronized set of safe data commit scan operations is assured prior to initiating a primary-secondary role swap operation. Moreover, because the synchronized set of safe data commit scan operations of the individual data storage systems of the distributed data storage system are synchronously timed to substantially overlap in time within a single synchronized safe data commit scan set interval, the occurrences of reductions in input/output response times outside the synchronized safe data commit scan set interval prior to initiating a planned primary-secondary role swap may be substantially reduced or eliminated.

In one embodiment, the synchronizing logic 34 of the primary data storage system 2a may be configured to, in response to a determination (block 436) that an optional primary-secondary role swap is not to be performed, to bypass the role swap related operations of blocks 438, 442 and 446 of FIG. 4. In a similar manner, the synchronizing logic 34 of the secondary data storage system 2b may be configured to bypass the primary-secondary role swap related operations of blocks 470 (FIG. 6), 474 and 478 in the event an optional primary-secondary role swap is not to be performed. In one embodiment, the synchronizing logic 34 of the primary data storage system 2a may be configured to embed in a message to the secondary data storage system, such as the start SDCS message1, for example, whether a primary-secondary role swap operation will be synchronized with the current set of SDCS operations.

In a similar manner, the synchronizing logic 34 of the tertiary data storage system 2c may be configured to bypass the primary-secondary role swap related operation of block 520 (FIG. 7) in the event an optional primary-secondary role swap is not to be performed. In one embodiment, the synchronizing logic 34 of the secondary data storage system 2b may be configured to embed in a message to the tertiary data storage system, such as the start SDCS message2, for example, whether a primary-secondary role swap operation will be synchronized with the current set of SDCS operations.

In one embodiment, the synchronizing logic 34 of the primary data storage system 2a may be configured to wait until it is determined (block 442, FIG. 4) that the SDCS complete message_S2 in this example, from the secondary data storage system 2b, indicating completion of the safe data commit scans, scan2 and scan3 of the secondary data storage system 2b and the tertiary data storage system 2c, has been received. However, it is appreciated that the SDCS complete message_S2 may not be received in a timely manner due to various factors or conditions in the secondary or tertiary data storage systems preventing timely completion of the safe data commit scan operations in one or more of those systems. For example, data may be pinned in a cache preventing destaging. Thus, should an SDCS complete message not be received (block 442) after a predetermined period of time, any issues preventing completion of safe data commit scan operations may be resolved in an appropriate manner either manually by an operator or automatically by the data storage systems. Once these issues are resolved, in one embodiment, the synchronizing logic 34 of the primary data storage system 2a may be configured to force another set of synchronized safe data commit scan operations by initiating (block 418) another safe data commit scan operation in the primary data storage systems and repeating the subsequent operations of FIGS. 4, 6 and 7 described above. Once the SDCS complete message is received (block 442) in a timely manner, the primary-secondary role swap may be triggered (block 446).

FIG. 5B depicts another example of synchronizing an optional primary-secondary role swap operation with a different set of synchronized safe data commit scans. Instead of synchronizing the role swap operation, swap1 with the synchronized set of scan operations, scan1, scan2, scan3, of FIG. 5A, FIG. 5B depicts an example of a primary-secondary role swap operation, swap1', being synchronized with a second synchronized set of safe data commit scan operations, primary safe data commit scan4, secondary safe data commit scan5, and tertiary safe data commit scan6, being conducted by safe data commit scan logic 40 in each of the primary data storage system 2a (FIG. 1), secondary data storage system 2b, and the tertiary data storage system 2c, respectively. Here too, each safe data commit scan operation, scan4 (FIG. 5B), scan5, scan6, destages data cached in a cache 28 (FIG. 2) of the associated data storage system 2a (FIG. 1), 2b, 2c, respectively, to a data storage unit 10a, 10b, 10c, respectively, of the associated data storage system 2a, 2b, 2c, respectively.

FIG. 5B depicts further operations of the synchronizing logic 34 and the safe data commit scan logic 40 in each data storage system 2a, 2b, 2c, in the three horizontal timelines, primary timeline1, secondary timeline2, tertiary timeline3, respectively, in connection with synchronizing a second, different set of safe data commit scan operations. As indicated in FIG. 5B, the second synchronized set of safe data commit scan operations, scan4, scan5, scan6, like the first synchronized set of safe data commit scan operations described in connection with FIG. 5A, are synchronously timed to substantially overlap in the timelines within a single synchronized safe data commit scan set interval, interval_SET2 in this example, to reduce or eliminate the occurrences of reductions in input/output response times outside the synchronized safe data commit scan set interval_SET2 which are caused by safe data commit scan operations in the data storage systems 2a, 2b, 2c, prior to initiation of a role swap operation. In the example of FIG. 5B, the safe data commit scan operations, scan5 and scan6, are initiated in response to start safe data commit scan messages which are received prior to expiration of local synchronized timer intervals.

Returning to FIG. 4 and the automatic operations of the synchronizing logic 34 of the primary data storage system 2a, as described above, the synchronizing logic 34 of the primary data storage system 2a upon completion of the safe data commit scan operation, scan1 of the primary data storage system 2a, initiates (block 434, FIG. 4) at a time I1 (FIG. 5A) another synchronizing timer interval, primary global timer interval1 (FIGS. 5A, 5B) in the primary data storage system 2a, to synchronize another set of synchronized safe data commit scan operations of the data storage systems 2a, 2b, 2c. Upon expiration (block 414, FIG. 4) of the timer interval1 (FIG. 5B), the synchronizing logic 34 of the primary data storage system 2a initiates (block 418, FIG. 5A) a primary safe data commit scan operation of the next set of synchronized safe data commit scan (SDCS) operations. In the example of FIG. 5B, the next set of synchronized SDCS operations includes the primary safe data commit scan (SDCS) operation, scan4, in the primary timeline1 in the primary data storage system. As shown in FIG. 5B, the safe data commit scan operation, scan4, is initiated at time S4 in the primary data storage system 2a (FIG. 1), which marks the beginning of the synchronized safe data commit scan set interval_SET2 for the second set of synchronized SDCS operations.

Further, at or about the same time S4 that the synchronizing logic 34 of the primary data storage system 2a initiates (block 418, FIG. 5B) another safe data commit scan (SDCS) operation in the primary data storage system 2a, the synchronizing logic 34 of the primary data storage system 2a sends (block 422, FIG. 4) another start safe data commit scan (SDCS) message to the secondary data storage system. In the example of FIG. 5B, the "start SDCS message3 is sent at or about the time S4 to the secondary data storage system 2b (FIG. 1).

As explained in greater detail below in connection with FIG. 6, the secondary data storage system 2b uses the start SDCS message3 from the primary data storage system 2a to synchronize in the secondary data storage system 2b a safe data commit scan operation of the next set of synchronized SDCS operations with the concurrent and parallel primary safe data commit scan operation, scan4, of the next set of synchronized SDCS operations, in the primary data storage system 2a. Before turning to FIG. 6, it is noted that in a manner similar to that described above in connection with the wait operation wait1, the synchronizing logic 34 of the primary data storage system 2a, upon completion (block 426) of the safe data commit scan operation, scan4 in this example, and upon determination (block 436) that a primary-secondary role swap operation is to be synchronized with the second set of SDCS operations of FIG. 5B, waits (block 438, FIG. 4) in a wait operation, wait4, FIG. 5B, for a message from the secondary data storage system 2b, indicating that the safe data commit scans, scan5 and scan6, of the secondary and tertiary data storage systems 2b, 2c, respectively have been completed. As noted above, waiting for receipt of a scan complete message facilitates synchronizing a primary-secondary role swap with completion of the set of synchronized safe data commit scan operations. The wait operation wait4 is selected to be performed if a primary-secondary role swap1' is determined (block 436) to be performed in connection with the synchronized set of safe data commit scan operations of FIG. 5B.

Returning to FIG. 6 and the automatic operations of the synchronizing logic 34 of the secondary data storage system 2b, as noted above, the synchronizing logic 34 of the secondary data storage system 2b, upon completion (block 462) of the secondary safe data commit scan2 in the secondary data storage system 2b, initiates (block 466, FIG. 6) the synchronizing timer interval, secondary local timer interval2 (FIGS. 5A, 5B) in the secondary data storage system at a time I2 (FIG. 5A) in the secondary timeline2 of the secondary data storage system 2b (FIG. 1). Also, the primary-secondary role swap related operations of blocks 470 (FIG. 6), 474 and 478 may be bypassed in the event the primary-secondary role swap1 (FIG. 5A) is not to be performed.

The synchronizing logic 34 of the secondary data storage system 2b is configured to determine (block 480, FIG. 6) during the synchronizing secondary local timer interval2 (FIG. 5B), whether the next start safe data commit scan (SDCS) message, start SDCS message3, sent (block 422, FIG. 4) by the primary data storage system to the secondary data storage system 2b, has been received. In the example of FIG. 5B, the "start SDCS message3" is sent by the primary data storage system 2a and is received by the secondary data storage system 2b before expiration of the synchronizing secondary local timer interval2. As previously mentioned, the duration of the secondary local timer interval2 (FIGS. 5A, 5B) in the secondary data storage system 2b may be set in one embodiment, to be slightly longer than that of the duration of the synchronizing primary global timer interval1 of the primary data storage system. As a result, in a typical set of synchronized SDCS operations, the start SDCS message will be received from the primary data storage system before expiration of the synchronizing secondary local timer interval of the secondary data storage system.

In response to the "start SDCS message3" received at time S5 at the secondary data storage system 2b, the synchronizing logic 34 of the secondary data storage system 2b resets (block 482) the local timer interval2 (as represented by the terminal hash marked portion of the local timer interval2) and initiates (block 454, FIG. 6) another safe data commit scan (SDCS) operation, scan5, at the time S5 in this example, in the secondary timeline2 in the secondary data storage system. As a result, both safe data commit scan operations, scan4 and scan5, of the primary data storage system 2a and the secondary data storage system 2b, respectively, occur within the single synchronized safe data commit scan set interval_SET2 for the second synchronized set of safe data commit scan operations.

Moreover, because the local timer interval2 is reset (block 482) upon receipt of the start safe data commit scan message3, a safe data commit scan operation is initiated (block 454) only by the received start message3 rather than being initiated again in response to a subsequent expiration of the local synchronizing timer interval2. In this manner, each safe data commit scan operation of a particular data storage system is initiated by either a start message or by expiration of the local synchronizing timer interval but not both in any one safe data commit scan set interval such as the safe data commit scan set interval_SET2, for example.

The synchronizing logic 34 of the secondary data storage system 2b also sends (block 458, FIG. 6) another start safe data commit scan message, start SDCS message4 (FIG. 5B) to the tertiary storage system in a manner similar to that described above in connection with start SDCS message2 of FIG. 5A. In the example of FIG. 5B, the "start SDCS message4 is sent at or about the time S5 to the tertiary data storage system 2c (FIG. 1).

As explained in greater detail below in connection with FIG. 7, the tertiary data storage system 2c uses the start SDCS message4 from the secondary data storage system 2b to synchronize in the tertiary data storage system 2c, a safe data commit scan operation of the next set of synchronized SDCS operations with the concurrent and parallel primary and secondary safe data commit scan operations, scan4 and scan5 of the next set of synchronized SDCS operations. Before turning to FIG. 7, it is noted that, in a manner similar to that described above in connection with the wait operation wait2 (FIG. 5A), the synchronizing logic 34 of the secondary data storage system 2b, upon completion (block 462) of the safe data commit scan operation, scan5 in this example, waits (block 470, FIG. 6) in a wait operation, wait5, FIG. 5B, for a message from the tertiary data storage system 2c, indicating that the safe data commit scan6, of the tertiary data storage system 2b has been completed. As noted above, waiting for receipt of a scan complete message facilitates synchronizing a primary-secondary role swap with completion of the set of synchronized safe data commit scan operations.

Returning to FIG. 7 and the automatic operations of the synchronizing logic 34 of the tertiary data storage system 2c, as noted above, the synchronizing logic 34 of the tertiary data storage system 2c, upon completion (block 512) of the tertiary safe data commit scan3 in the tertiary data storage system 2c, initiates (block 516, FIG. 7) the synchronizing timer interval, tertiary local timer interval3 (FIGS. 5A, 5B) in the tertiary data storage system at a time I3 (FIG. 5A) in the tertiary timeline3 of the tertiary data storage system 2c (FIG. 1). Also, the primary-secondary role swap related operation of blocks 520 (FIG. 7) may be bypassed in the event the primary-secondary role swap1 (FIG. 5A) is not to be performed.

The synchronizing logic 34 of the tertiary data storage system 2c is configured to determine (block 524, FIG. 6) during the synchronizing tertiary local timer interval3, whether the next start safe data commit scan (SDCS) message, start SDCS message4, sent (block 458, FIG. 6) by the secondary data storage system to the tertiary data storage system 2c, has been received. In the example of FIG. 5B, the "start SDCS message4" is sent by the secondary data storage system 2b and is received by the tertiary data storage system 2b before expiration of the synchronizing tertiary local timer interval3. As previously mentioned, the duration of the tertiary local timer interval3 (FIGS. 5A, 5B) in the tertiary data storage system 2c may be set in one embodiment, to be slightly longer than that of the duration of the synchronizing primary global timer interval1 of the primary data storage system or the secondary local timer interval2. As a result, in a typical set of synchronized SDCS operations, the start SDCS message will be received from the secondary data storage system before expiration of the synchronizing tertiary local timer interval3 of the tertiary data storage system.

In response to the "start SDCS message4" received (block 524) at time S6 at the tertiary data storage system 2c, the synchronizing logic 34 of the tertiary data storage system 2c resets (block 526) the local timer interval3 and initiates (block 508, FIG. 7) another safe data commit scan (SDCS) operation, scan6, at a time S6 in this example, in the tertiary timeline3 in the tertiary data storage system. As a result, all three synchronized safe data commit scan operations, scan4, scan5 and scan6 of the primary data storage system 2a, the secondary data storage system 2b and the tertiary data storage system 2c, respectively, occur within the single synchronized safe data commit scan set interval_SET2 for the second synchronized set of safe data commit scan operations.

In a manner similar to that explained above in connection with the secondary data storage system 2b, the local timer interval3 is reset (block 526) at time S6 so that a safe data commit scan operation is initiated only by the received start message4 rather than being initiated again in response to a subsequent expiration of the local synchronizing timer interval3. In this manner, each safe data commit scan operation is initiated by either a start message or by expiration of the local synchronizing timer interval but not both in any one data storage system in any one safe data commit scan set interval such as the safe data commit scan set interval_SET2, for example.

In a manner similar to that described above in connection with SDCS complete message_T3, the synchronizing logic 34 of the tertiary data storage system 2c, upon completion (block 512) of the tertiary safe data commit scan6 in the tertiary data storage system 2c, and following a log operation (block 516), Log 6 and initiation of another local tertiary synchronizing timer interval6, sends (block 520, FIG. 7) a message, SDCS complete message_T6 in this example, to the secondary data storage system 2b, indicating completion of the tertiary safe data commit scan6 in the tertiary data storage system 2c. Returning to FIG. 6, as set forth above, the secondary data storage system 2b waits (block 470, FIG. 6) in a wait operation, wait5, for the message, SDCS complete message_T6 in this example, from the tertiary data storage system 2c, indicating that the safe data commit scan, scan6, of the tertiary data storage system 2c has been completed.

The synchronizing logic 34 of the secondary data storage system 2b determines (block 474, FIG. 6) whether the SDCS complete message_T6 in this example, from the tertiary data storage system 2c, indicating completion of the safe data commit scan6 of the tertiary data storage system 2c, has been received. The synchronizing logic 34 of the secondary data storage system 2b, in response to a receipt (block 474) of the SDCS complete message_T6 from the tertiary data storage system 2c, indicating completion of the tertiary SDCS scan6, and in response to completion (block 462, FIG. 6) of the secondary safe data commit scan5 in the secondary data storage system 2b, sends (block 478, FIG. 6) a message, that is, SDCS complete message_S5 in this example, to the primary data storage system 2a, indicating completion of both the secondary safe data commit scan5 in the secondary data storage system 2b, and the tertiary safe data commit scan6 in the tertiary data storage system 2c.

Returning to FIG. 4, as set forth above, the primary data storage system 2a waits (block 438, FIG. 4) in a wait operation, wait4, for a message, SDCS complete message_S5 in this example, from the secondary data storage system 2b, indicating that the safe data commit scans, scan5 and scan6, of the secondary data storage system 2b and the tertiary data storage system 2c, respectively, have been completed.

The synchronizing logic 34 of the primary data storage system 2a determines (block 442, FIG. 4) whether the SDCS complete message_S5 in this example, from the secondary data storage system 2b, indicating completion of the safe data commit scans, scan5 and scan6 of the secondary data storage system 2b and the tertiary data storage system 2c, have been received. The synchronizing logic 34 of the primary data storage system 2a, in response to a determination (block 442) that the SDCS complete message_S5 from the secondary data storage system 2b, has been received, initiates (block 446, FIG. 4) at a time T1', a primary-secondary role swap, that is, swap1', of the primary data storage system 2a and the secondary data storage system 2b. In this manner, completion of the synchronized set of safe data commit scan operations is assured prior to initiating the primary-secondary role swap operation, swap1'. Moreover, because the synchronized set of safe data commit scan operations of the individual data storage systems of the distributed data storage system are synchronously timed to substantially overlap in time within a single synchronized safe data commit scan set interval, the occurrences of reductions in input/output response times outside the synchronized safe data commit scan set interval, interval_set2, prior to initiating the primary-secondary role swap1', may be substantially reduced or eliminated.

FIG. 5B' depicts another example of synchronizing a primary-secondary role swap operation with a different set of synchronized safe data commit scans. Instead of synchronizing the role swap operation, swap1' with the synchronized set of scan operations, scan4, scan5, scan6, of FIG. 5B, FIG. 5B' depicts an example of a primary-secondary role swap operation, swap1", being synchronized with another synchronized set of safe data commit scan operations, which includes in addition to primary safe data scan4, secondary safe data commit scan5' and tertiary safe data commit scan6' in which the start SDCS messages are received after expiration of timer intervals. Here too, each safe data commit scan operation, scan4 (FIG. 5B'), scan5', scan6', destages data cached in a cache 28 (FIG. 2) of the associated data storage system 2a (FIG. 1), 2b, 2c, respectively, to a data storage unit 10a, 10b, 10c, respectively, of the associated data storage system 2a, 2b, 2c, respectively.

In this example, a start SDCS message such as the start SDCS message3' is sent by the primary data storage system 2a or is received by the secondary data storage system 2b after expiration of the synchronizing secondary local timer interval2 at a time S5'. The start SDCS message3' is sent (block 422, FIG. 4) by the primary data storage system 2a following expiration (block 414, FIG. 4) of the global timer interval1 and in connection with the initiation (block 418, FIG. 4) of the primary safe data commit scan4 in a manner similar to that described above for scan4 and start SDCS message3 of FIG. 5B. In addition, the synchronizing logic 34 of the primary data storage system 2a, upon completion (block 426) of the safe data commit scan operation, scan4 in this example, and a log operation (block 430) Log 4 and global synchronizing timer interval initiation (block 434, FIG. 4) of interval4, waits (block 438, FIG. 4) in a wait operation, wait4, FIG. 5B', for a message from the secondary data storage system 2b, indicating that the safe data commit scans, scan5' and scan6', of the secondary and tertiary data storage systems 2b, 2c, respectively have been completed, if it is determined that a primary-secondary role swap, swap1' is to be performed. As noted above, waiting for receipt of a scan complete message facilitates synchronizing a primary-secondary role swap with completion of the set of synchronized safe data commit scan operations.

The start SDCS message3' may be delayed in reaching the secondary data storage system 2b due to a variety of factors including network congestion and operational issues at the primary data storage system 2a. However, because the duration of the secondary local timer interval2 (FIGS. 5A, 5B) in the secondary data storage system 2b may be set in one embodiment, to be slightly longer than that of the duration of the synchronizing primary global timer interval1 of the primary data storage system, delay in the initiation (block 454, FIG. 6) of another safe data commit scan (SDCS) operation, scan5', at a time S5' in this example, in the secondary timeline2 in the secondary data storage system, is limited.

In this embodiment, if the synchronizing logic 34 of the secondary data storage system 2b determines (block 480, FIG. 6) that the next start safe data commit scan (SDCS) message, start SDCS message3' in this example, has not yet been received during the secondary local timing interval2, the synchronizing logic 34 of the secondary data storage system 2b determines (block 484, FIG. 6) whether the synchronizing secondary local timer interval2 has expired. In response to expiration (block 484, FIG. 6) of the secondary synchronizing timer interval2 and in the absence of prior receipt (block 480) of the start safe data commit scan message3', the synchronizing logic 34 of the secondary data storage system 2b initiates (block 454, FIG. 6) another safe data commit scan (SDCS) operation, scan5' (FIG. 5B'), at a time S5' in this example, in the secondary timeline2 in the secondary data storage system of FIG. 5B'. In addition, the synchronizing logic 34 of the secondary data storage system 2b sends (block 458, FIG. 6) another start safe data commit scan message, start SDCS message4' (FIG. 5B) to the tertiary storage system in a manner similar to that described above in connection with start SDCS message2 of FIG. 5A.

Thus, once the synchronizing secondary local timer interval2 expires without prior receipt of a start SDCS message3' from the primary data storage system, the secondary SDCS operation scan5' may be initiated without further waiting for the start SDCS message3'. As a result, notwithstanding delay in sending or receiving the start SDCS message3', the secondary SDCS operation scan5' may be initiated and completed within the safe data commit scan set interval_SET2 for the second set of SDCS operations.

If a safe data commit scan operation such as scan5', for example, is initiated in response to expiration of a local timer interval such as the local timer interval2 of FIG. 5B', the subsequent receipt of a late start safe data commit scan message such as message3'(FIG. 5B'), is effectively ignored and is not used to initiate another safe data commit scan operation. Conversely, as noted above in connection with FIG. 5B, if a safe data commit scan operation is initiated in response to receipt of a timely start safe data commit scan message3 (FIG. 5B) prior to expiration of the local timer interval2, the local timer interval2 is reset as described above and is not used to initiate another safe data commit scan operation. In this manner, each safe data commit scan operation of the secondary data storage system 2b is initiated by either a start SDCS message or by expiration of the local synchronizing timer interval but not both in the same safe data commit scan set interval.

In an alterative embodiment, in response to expiration of the synchronizing secondary local timer interval2 and the absence of receipt of the second start safe commit scan operation message3' from the primary data storage system by the time the synchronizing secondary local timer interval2 expires, the synchronizing logic 34 of the secondary data storage system 2b may be configured to contact the primary data storage system 2a to ascertain the status of the primary safe data commit scan operation, scan4, of the second synchronized set of safe data commit scan operations. A determination may be made by the synchronizing logic 34 of the secondary data storage system 2b as to whether to reset the timing of the synchronizing timer interval of time in the second data storage system or initiate the safe data commit scan operation of the second synchronized set of safe data commit scan operations in the second data storage system as a function of the status of the safe data commit scan operation of the second synchronized set of safe data commit scan operations in the primary data storage system.

For example, the status information from the primary data storage system may indicate whether the copy relationships between the primary and secondary data storage systems are still in place or have been terminated for various reasons. If the relationships have been terminated, the need for safe data commit scan operations may have been obviated by such terminations. Thus, the synchronizing timer interval in the secondary data storage system may be reset. Conversely, if the status information from the primary data storage system indicates that the safe data commit scan is proceeding in the primary data storage system, a concurrent and parallel safe data commit scan operation may be initiated in the secondary data storage system not withstanding that the start safe data commit scan message was not received by the secondary data storage system.

The synchronizing logic 34 of the secondary data storage system 2b, upon completion of the safe data commit scan operation, scan5' in this example, waits (block 470, FIG. 6) in a wait operation, wait5', FIG. 5B', for a message from the tertiary data storage system 2c, indicating that the safe data commit scan, scan6', of the tertiary data storage system 2c has been completed. As noted above, waiting for receipt of a scan complete message facilitates synchronizing a primary-secondary role swap with completion of the set of synchronized safe data commit scan operations.

Returning to FIG. 7 and the operations of the synchronizing logic 34 of the tertiary data storage system 2c, as set forth above, the synchronizing logic 34 of the tertiary data storage system 2c, upon completion (block 512, FIG. 7) of the tertiary safe data commit scan3 in the tertiary data storage system 2c, initiates (block 516, FIG. 7) a synchronizing timer interval, tertiary local timer interval3 (FIGS. 5A, 5B) in the tertiary data storage system at a time I3 (FIG. 5A) in the tertiary timeline3 of the tertiary data storage system 2c (FIG. 1). The synchronizing logic 34 of the tertiary data storage system 2c is configured to determine (block 524, FIG. 7) whether the next start safe data commit scan (SDCS) message, start SDCS message4', sent (block 458, FIG. 6) by the secondary data storage system 2b to the tertiary data storage system 2c has been received during the duration of the tertiary local timer interval3. In the example of FIG. 5B', the start SDCS message4' is sent by the secondary data storage system 2b or is received by the tertiary data storage system 2c after expiration of the synchronizing tertiary local timer interval3. By comparison in the example of FIG. 5B, the start SDCS message4 is sent by the secondary data storage system 2b and is received by the tertiary data storage system 2c before expiration of the synchronizing tertiary local timer interval3.

In one aspect of the present description, the start SDCS message2 received at the tertiary data storage system 2c from the secondary data storage system 2b, in a manner similar to the start SDCS message1 discussed above, includes synchronized timer interval duration parameter data. In one embodiment, the synchronized timer interval duration parameter data packaged in the start SDCS message2 from the secondary data storage system 2a defines the interval of a synchronizing timer interval such as the primary global timer interval1 or the secondary local timer interval2. The synchronizing logic 34 of the tertiary data storage system 2c is further configured to set the duration of the tertiary local timer interval3 (FIGS. 5A, 5B) in the tertiary data storage system 2c as a function of the synchronized timer interval duration parameter data received from the secondary data storage system 2b in the start SDCS message2 from the secondary data storage system 2b. Accordingly, in one embodiment, the duration of the tertiary local timer interval3 (FIGS. 5A, 5B) in the tertiary data storage system 2c may be set to be a small percentage (such as 10-20%, for example) or a small amount of time (such as 5-10 minutes, for example) greater than the duration of the primary synchronizing timer interval1 (FIG. 5A, 5B) or the secondary synchronizing timer interval2. Thus, in one embodiment, the timer interval3 may be set for a small percentage or small amount of time greater than an hour, for example. It is appreciated that other durations may be selected, depending upon the particular application.

It is further appreciated that setting the duration of the tertiary synchronizing timer interval3 to approximate that of the primary or secondary synchronizing timer intervals facilitates synchronizing the SDCS operations, scan3, scan4 and scan5 of the second set of synchronized SDCS operations to remain in a relatively restricted safe data commit scan set interval_SET2. At the same time, it is appreciated that setting the duration of the tertiary synchronizing timer interval3 to be slightly greater than that of the primary or secondary synchronizing timer interval facilitates synchronizing the SDCS operations of the primary, secondary and tertiary data storage systems based upon start SDCS messages rather than the expiration of synchronizing intervals, whichever occurs first, in the data storage systems as described in greater detail below.

As previously mentioned, the duration of the tertiary local timer interval3 (FIGS. 5A, 5B) in the tertiary data storage system 2c may be set in one embodiment, to be slightly longer than that of the duration of the synchronizing secondary local timer interval2 of the secondary data storage system. As a result, in a typical set of synchronized SDCS operations such as that depicted in FIG. 5B, the start SDCS message will be received from the secondary data storage system before expiration of the synchronizing tertiary local timer interval of the tertiary data storage system. Thus, in a typical set of synchronized SDCS operations, the SDCS operation will be initiated in response to a start SDCS message received from the secondary data storage system instead of expiration of the synchronizing tertiary local timer interval of the tertiary data storage system. However, should the start SDCS message from the secondary data storage system be delayed for too long a period, the SDCS operation will be initiated in response to expiration of the synchronizing tertiary local timer interval of the tertiary data storage as described below.

Accordingly, if the synchronizing logic 34 of the tertiary data storage system 2c determines (block 524, FIG. 7) that the next start safe data commit scan (SDCS) message has not yet been received during the tertiary local timer interval3, the synchronizing logic 34 of the tertiary data storage system 2c determines (block 530, FIG. 7) whether the synchronizing timer interval3 has expired. For example, FIG. 5B' depicts an example in which a start SDCS message4' has been delayed beyond the expiration of the synchronizing tertiary local timer interval3. Accordingly, in response to expiration (block 530, FIG. 7) of the tertiary synchronizing timer interval3 and in absence of the prior receipt of the start SDCS message4', the synchronizing logic 34 of the tertiary data storage system 2c initiates (block 508, FIG. 7) another safe data commit scan (SDCS) operation, scan6' (FIG. 5B'), at a time S6' in this example, in the tertiary timeline3 in the tertiary data storage system.

The start SDCS message4' may be delayed in reaching the tertiary data storage system 2c due to a variety of factors including network congestion and operational issues at the secondary data storage system 2b. However, because the duration of the tertiary local timer interval3 (FIGS. 5A, 5B) in the tertiary data storage system 2c may be set in one embodiment, to be slightly longer than that of the duration of the synchronizing secondary local timer interval2 of the secondary data storage system, subsequent delay in the initiation (block 508, FIG. 7) of another safe data commit scan (SDCS) operation, scan6', at a time S6' in this example, in the tertiary timeline2 in the tertiary data storage system, is limited. Thus, if the synchronizing tertiary local timer interval3 expires and the start SDCS message has not been received from the secondary data storage system, the tertiary SDCS operation scan6' may be initiated without further waiting for the start SDCS message4'. As a result, notwithstanding delay in sending or receiving the start SDCS message4', the tertiary SDCS operation scan6' may be initiated and completed within the safe data commit scan set interval_SET2 for the second set of SDCS operations.

In a manner similar to that described above in connection with SDCS complete message_T6 (FIG. 5B), the synchronizing logic 34 of the tertiary data storage system 2c, upon completion (block 512, FIG. 7) of the tertiary safe data commit scan6' in the tertiary data storage system 2c, sends (block 520, FIG. 7) a message, SDCS complete message_T6' in this example, to the secondary data storage system 2b, indicating completion of the tertiary safe data commit scan6' in the tertiary data storage system 2c. As set forth above, the secondary data storage system 2b waits (block 470, FIG. 6) in a wait operation, wait5', for the message, SDCS complete message_T6' in this example, from the tertiary data storage system 2c, indicating that the safe data commit scan, scan6', of the tertiary data storage system 2c has been completed.

The synchronizing logic 34 of the secondary data storage system 2b determines (block 474, FIG. 6) whether the SDCS complete message_T6' in this example, from the tertiary data storage system 2c, indicating completion of the safe data commit scan6' of the tertiary data storage system 2c, has been received. The synchronizing logic 34 of the secondary data storage system 2b, in response to a receipt (block 474) of the SDCS complete message_T6' from the tertiary data storage system 2c, indicating completion of the tertiary SDCS scan6', and in response to completion (block 462, FIG. 6) of the secondary safe data commit scan5' in the secondary data storage system 2b, sends (block 478, FIG. 6) a message, that is, SDCS complete message_S5' in this example, to the primary data storage system 2a, indicating completion of both the secondary safe data commit scan5' in the secondary data storage system 2b, and the tertiary safe data commit scan6' in the tertiary data storage system 2c. As set forth above, the primary data storage system 2a waits (block 438, FIG. 4) in a wait operation, wait4, for a message, SDCS complete message_S5' in this example, from the secondary data storage system 2b, indicating that the safe data commit scans, scan5' and scan6', of the secondary data storage system 2b and the tertiary data storage system 2c, respectively, have been completed.

The synchronizing logic 34 of the primary data storage system 2a determines (block 442, FIG. 4) whether the SDCS complete message_S5' in this example, from the secondary data storage system 2b, indicating completion of the safe data commit scans, scan5' and scan6' of the secondary data storage system 2b and the tertiary data storage system 2c, have been received. The synchronizing logic 34 of the primary data storage system 2a, in response to a determination (block 442) that the SDCS complete message_S5' from the secondary data storage system 2b, has been received, initiates (block 446, FIG. 4) at a time T'', a primary-secondary role swap, that is, swap1' (FIG. 5B'), of the primary data storage system 2a and the secondary data storage system 2b. In this manner, completion of the synchronized set of safe data commit scan operations is assured prior to initiating the primary-secondary role swap operation, swap1''. Moreover, because the synchronized set of safe data commit scan operations of the individual data storage systems of the distributed data storage system are synchronously timed to substantially overlap in time within a single synchronized safe data commit scan set interval, the occurrences of reductions in input/output response times outside the synchronized safe data commit scan set interval, interval_set2, prior to initiating the primary-secondary role swap1", may be substantially reduced or eliminated.

In a manner similar to that described above in connection with SDCS operations, scan1, scan2 and scan3, upon completion of SDCS operations, scan4, scan5 and scan6 of FIG. 5B, timestamps indicating the time of initiation of the SDCS operations, scan4, scan5 and scan6 are logged in log operations, Log 4, Log 5 and Log 6 of the data storage systems 2a, 2b, 2c, respectively, as shown in FIG. 5B. In addition, synchronizing timer intervals, interval4, interval5 and interval6 are initiated in the data storage systems 2a, 2b, 2c, respectively, as shown in FIG. 5B, for the next set of synchronized SDCS operations.

In the example of FIG. 5B', upon completion of SDCS operations, scan4, scan5' and scan6' of FIG. 5B', timestamps indicating the time of initiation of the SDCS operations, scan4, scan5' and scan6' are logged in log operations, Log 4, Log 5' and Log 6' of the data storage systems 2a, 2b, 2c, respectively, as shown in FIG. 5B'. In addition, synchronizing timer intervals, interval4, interval5' and interval6' are initiated in the data storage systems 2a, 2b, 2c, respectively, as shown in FIG. 5B', for the next set of synchronized SDCS operations.

It is appreciated that synchronized primary-secondary role swap operations with synchronized safe data commit scan operations in accordance with the present description may be employed in data storage systems having a variety of different hierarchical structures other than the primary, secondary, tertiary hierarchical structure described above. For example, data storage systems may have hierarchical levels beyond tertiary, such as a fourth level, fifth level, etc. Also, data storage systems may permit one to many copy relationships such that a primary data storage system may have multiple secondary data storage systems, a secondary data storage system may have multiple tertiary data storage systems, etc.

Figure 8:
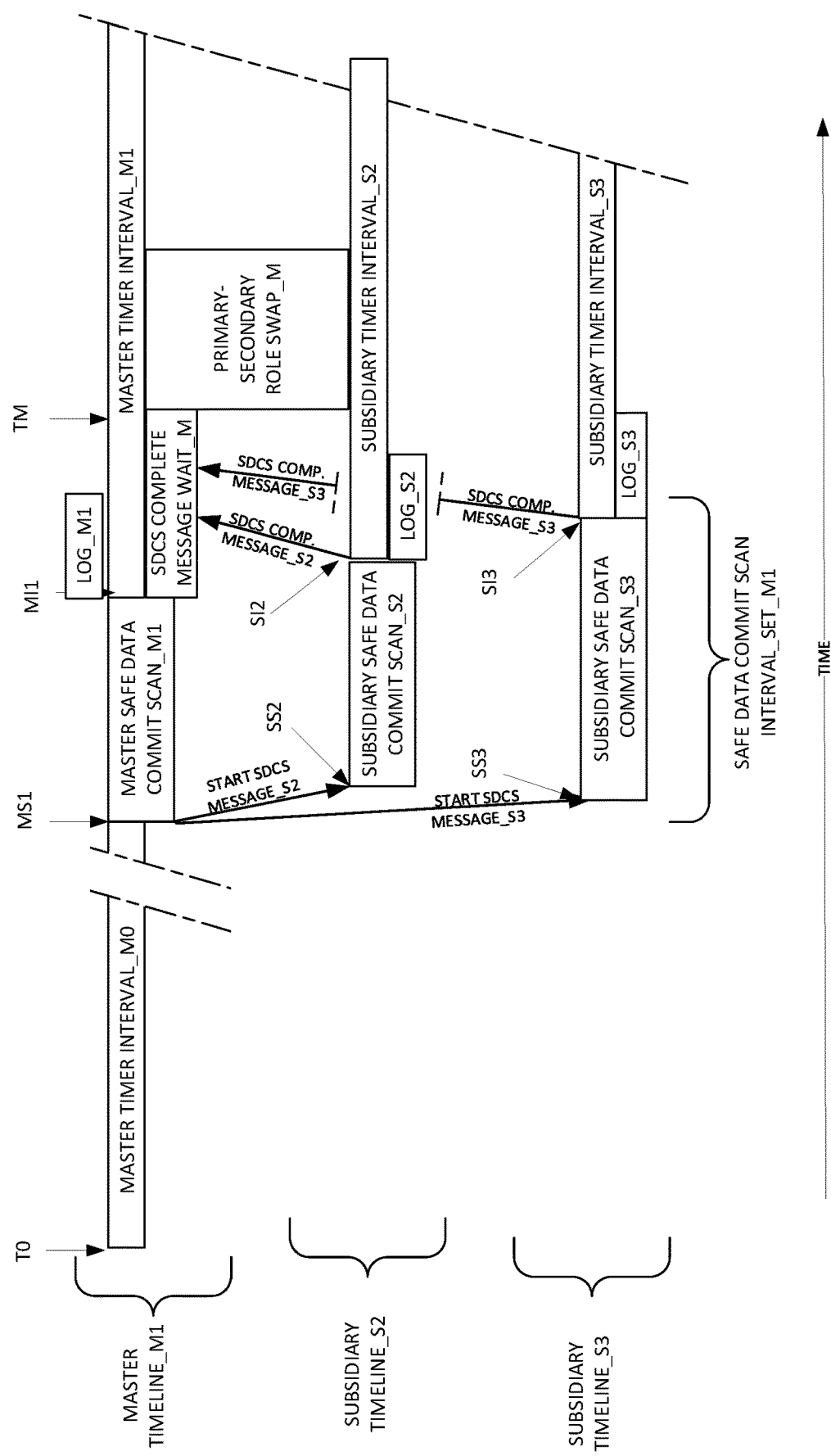
FIG. 8 depicts an example of timelines of operations of master and subsidiary data storage systems of a distributed data storage system employing synchronized primary-secondary role swaps with synchronized safe data commit scans in accordance with one aspect of the present description.

FIG. 8 depicts another example of synchronized primary-secondary role swap operations with synchronized safe data commit scan operations in a hierarchical data storage system in which one data storage system has been selected as a master data storage system and multiple data storage systems have been selected as subsidiary data storage systems to the master data storage system in a distributed data storage system. For example, the data storage systems 2a, 2b and 2c (FIG. 1), may be configured in this example as a master data storage system, a first subsidiary data storage system and a second subsidiary data storage system, respectively. The master and subsidiary data storage systems 2a, 2b and 2c may also be configured as primary, secondary and/or tertiary data storage systems of mirror copy relationships in a manner similar to that described above. Thus, the master data storage system 2a may also be a primary data storage system of a mirror copy relationship, for example. However, it is appreciated that a master data storage system may be a secondary or tertiary data storage system in other embodiments.

In a timeline_M1 (FIG. 8) of the master data storage system, upon expiration of an initial synchronizing master timer interval_M0, a safe data commit scan operation, scan_M1, is initiated at a time indicated at MS1. At or about the time MS1 that the safe data commit scan operation, scan_M1, is initiated, the master data storage system issues concurrent or approximately concurrent start SDCS messages, message_S2 and message_S3, directly to the two subsidiary data storage systems. The concurrent and parallel start SDCS messages, message_S2 and message_S3, may be implemented as a single broadcast message received directly by the two subsidiary data storage systems or as distinct messages issued separately either in parallel or serially, for example. By comparison, in the embodiments of FIG. 5A-5B', start safe data commit scan messages were propagated or relayed from the secondary data storage system to the tertiary data storage system.

In a manner similar to that described above in connection with the wait operation, wait1 (FIG. 5A) for a primary data storage system, the synchronizing logic 34 of the master data storage system 2a is also configured to, upon completion of the master safe data commit scan_M1 to wait in a wait operation, wait_M, for completion messages, SDCS complete message_S2 and SDCS message_S3, from the subsidiary data storage systems 2b, 2c, respectively indicating that the safe data commit scans, scan_S2 and scan_S3, of the subsidiary data storage systems 2b, 2c, respectively, have been completed. In this embodiment, safe data commit scan complete messages are sent by each subsidiary data storage system directly to the master data storage system instead of being propagated or relayed from one data storage system to another before reaching the master data storage system. Here too, waiting for receipt of scan complete messages facilitates synchronizing a primary-secondary role swap with completion of the set of synchronized safe data commit scan operations.

In response to a start SDCS message_S2 from the master data storage system, a safe data commit scan operation, scan_S2, is initiated at a time indicated at SS2 in a timeline_S2 for one subsidiary data storage system, data storage system 2b in this example. Similarly, in response to a start SDCS message_S3 from the master data storage system, a safe data commit scan operation, scan_S3, is initiated at a time indicated at SS3 in a timeline_S3 for the other subsidiary data storage system, data storage system 2c, in the example of FIG. 8.

Thus, the subsidiary data storage systems use the start SDCS message or messages directly from the master data storage system to synchronize safe data commit scan operations in the subsidiary data storage systems with a concurrent and parallel safe data commit scan operation in the master data storage system. As a result, the safe data commit scan operations, scan_M1, scan_S2 and scan_S3 of the master and two subsidiary data storage systems 2a, 2b, 2c, respectively, are synchronized to run substantially concurrently. Thus all three synchronized safe data commit scan operations, scan_M1, scan_S2 and scan_S3 of a first set of SDCS operations of FIG. 8, occur within the single synchronized safe data commit scan set interval_SET_M1 for the first synchronized set of safe data commit scan operations. As a result, any intervals of reduced response times due to safe data commit scan operations are also substantially concurrent and substantially limited to the synchronized safe data commit scan set interval_SET_M1.

The synchronizing logic 34 of the subsidiary data storage system 2c is further configured to, upon completion of the subsidiary safe data commit scan_S3 in the subsidiary data storage system 2c, to send the message, SDCS complete message_S3 in this example, directly to the master data storage system 2a, indicating completion of the subsidiary safe data commit scan_S3 in the subsidiary data storage system 2c. Accordingly, the SDCS complete message_S3 bypasses the subsidiary data storage system 2b and is sent directly to the master data storage system 2a.

In a similar manner, the synchronizing logic 34 of the subsidiary data storage system 2b is further configured to, upon completion of the subsidiary safe data commit scan_S2 in the subsidiary data storage system 2b, to send the message, SDCS complete message_S2 in this example, directly to the master data storage system 2a, indicating completion of the subsidiary safe data commit scan_S2 in the subsidiary data storage system 2c. Accordingly, the SDCS complete message_S2 bypasses other subsidiary data storage systems such as the system 2c, and is sent directly to the master data storage system 2a.

As set forth above, the master data storage system 2a waits in a wait operation, wait_M, for the messages, SDCS complete message_S2 and SDCS complete message_S3 in this example, from the subsidiary data storage systems 2b, 2c, indicating that the safe data commit scans, scan_S2 and scan_S3, of the subsidiary data storage systems 2b, 2c have been completed. The synchronizing logic 34 of the master data storage system 2a determines whether the SDCS complete messages, message_S2 and message_S3 in this example, from the subsidiary data storage systems 2b, 2c indicating completion of the safe data commit scans, scan_S2 and scan_S3 of the subsidiary data storage systems 2b, 2c, respectively, have been received.

The synchronizing logic 34 of the master data storage system 2a is further configured to, in response to a determination that the SDCS complete messages have been received from all the subsidiary data storage systems to initiate at time TM a primary-secondary role swap_M of the primary data storage system 2a and the secondary data storage system 2b. In this manner, completion of the synchronized set of safe data commit scan operations is assured prior to initiating the primary-secondary role swap operation. Moreover, because the synchronized set of safe data commit scan operations of the individual data storage systems of the distributed data storage system are synchronously timed to substantially overlap in time within a single synchronized safe data commit scan set interval, the occurrences of reductions in input/output response times outside the synchronized safe data commit scan set interval prior to initiating a planned primary-secondary role swap may be substantially reduced or eliminated.

In a manner similar to that described above in connection with SDCS operations, scan1 (FIG. 5A), scan2 and scan3, upon completion of the first set of SDCS operations, scan_M1, scan_S2 and scan_S3 of FIG. 8, timestamps indicating the time of initiation of the SDCS operations, scan_M1, scan_S2 and scan_S3 are logged in log operations, Log_M1, Log_S2 and Log_S3, respectively, of the data storage systems 2a, 2b, 2c, respectively, as shown in FIG. 8. In addition, synchronizing timer intervals, master timer interval_M1, subsidiary timer interval_S2 and subsidiary timer interval_S3 are initiated at times MI1, SI2, SI3, respectively, in the data storage systems 2a, 2b, 2c, respectively, as shown in FIG. 8, for the next set of synchronized SDCS operations.

Here too, the duration of the synchronizing subsidiary timer intervals, interval_S2 and interval_S3, may be set in one embodiment, to be slightly longer than that of the duration of the synchronizing master timer interval_M1 of the master data storage system. As a result, in a typical set of synchronized SDCS operations, the start SDCS messages will be received from the master data storage system before expiration of the synchronizing subsidiary timer interval of a subsidiary data storage system. Thus, in a typical set of synchronized SDCS operations, the SDCS operation will be initiated in response to a start SDCS message received from the master data storage system in a manner similar to that described above in connection with FIG. 5B, instead of in response to expiration of the synchronizing subsidiary timer interval of a subsidiary data storage system in a manner similar to that described above in connection with FIG. 5B'. However, should the start SDCS message from the master data storage system be delayed for too long a period in a particular subsidiary data storage system, the SDCS operation in that subsidiary data storage system will be initiated in response to expiration of the synchronizing subsidiary timer interval of the associated data storage system in a manner similar to that described above in connection with FIG. 5B'.

As a result, all three synchronized safe data commit scan operations of each set of SDCS operations of the master and subsidiary data storage systems, will occur within a single synchronized safe data commit scan set interval such as safe data commit scan set interval_SET_M1, for example, whether the SDCS operations are triggered by a start SDCS message from the master data storage system, or by expiration of a synchronizing subsidiary timer interval. Thus, each safe data commit scan operation in a subsidiary data storage system is initiated by either a start message or by expiration of the local synchronizing timer interval but not both in any one safe data commit scan set interval such as the safe data commit scan set interval for a particular set of synchronized safe data commit scan operations. In one embodiment, the sending of SDCS complete messages and waiting for receipt of SDCS complete messages may be bypassed for a particular set of synchronized safe data commit scan operations in the data storage systems should a primary-secondary role swap operation not be selected for synchronization with that particular set of synchronized safe data commit scans.

It is seen from the above that prior to initiation of a primary-secondary role swap operation, a synchronized set of safe data commit scan operations of the individual data storage systems of a distributed data storage system are synchronized with the role swap operation and with each other to be synchronously timed to substantially overlap in time within a single synchronized safe data commit scan set interval to reduce or eliminate the occurrences of reductions in input/output response times outside the synchronized safe data scan commit interval prior to initiation of the role swap operation. In addition, the completion of the synchronized set of safe data commit scan operations is verified prior to initiation of the role swap operation. Other aspects and advantages may be realized, depending upon the particular application.

Figure 9:
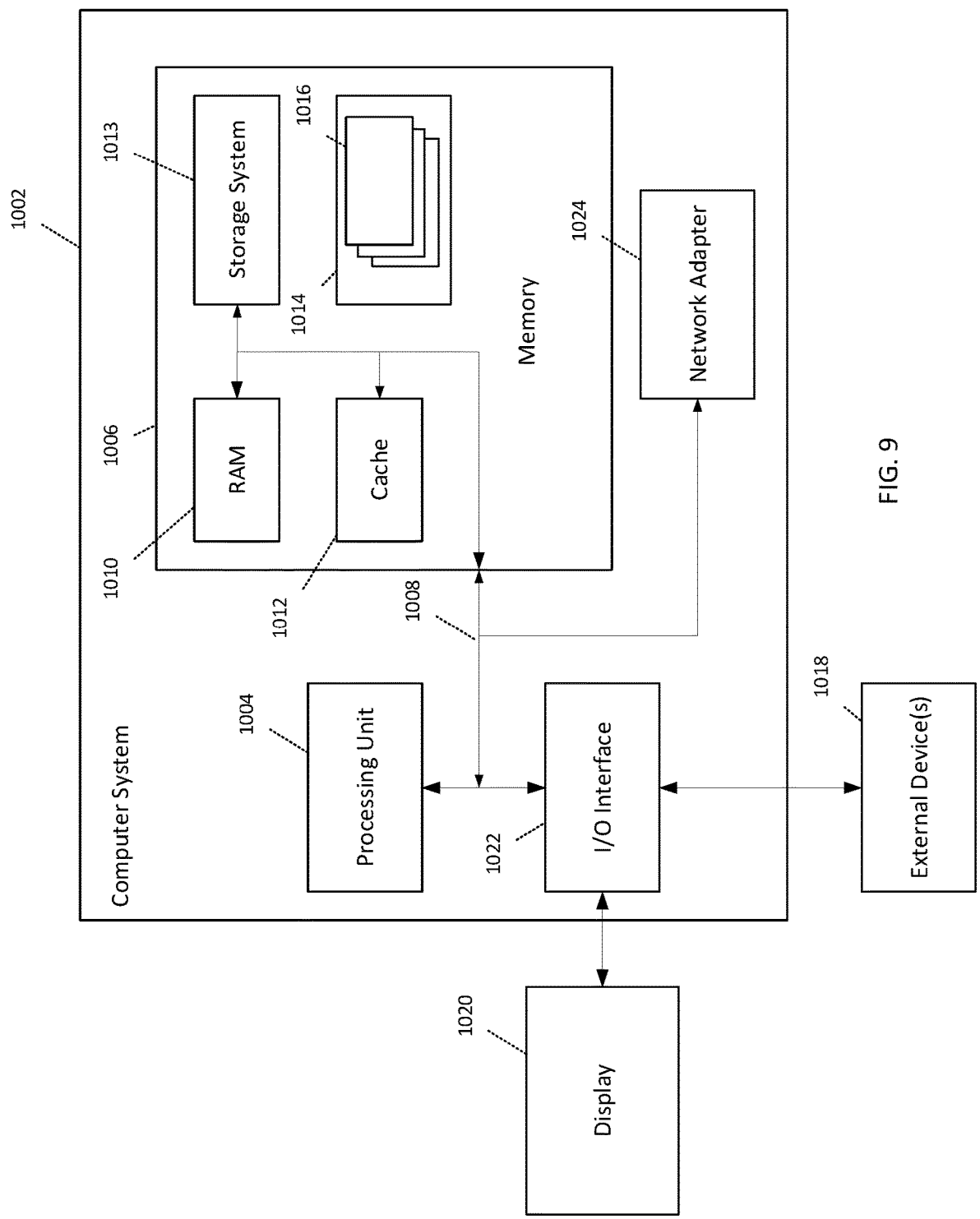
FIG. 9 illustrates a computer embodiment employing synchronized primary-secondary role swaps with synchronized safe data commit scans in accordance with one aspect of the present description.

The computational components of the figures may each be implemented in one or more computer systems, such as the computer system 1002 shown in FIG. 9. Computer system/server 1002 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1002 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, the computer system/server 1002 is shown in the form of a general-purpose computing device.

The components of computer system/server 1002 may include, but are not limited to, one or more processors or processing units 1004, a system memory 1006, and a bus 1008 that couples various system components including system memory 1006 to processor 1004. Bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1002 typically includes a variety of computer system readable media. Such media may be any available media that is accessible by computer system/server 1002, and it includes both volatile and non-volatile media, removable and non-removable media.

System memory 1006 can include computer system readable media in the form of volatile memory, such as random access memory (RAM) 1010 and/or cache memory 1012. Computer system/server 1002 may further include other removable/non-removable, volatile/non-volatile computer system storage media. By way of example only, storage system 1013 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1008 by one or more data media interfaces. As will be further depicted and described below, memory 1006 may include at least one program product having a set (e.g., at least one) of program modules that are configured to carry out the functions of embodiments of the invention.

Program/utility 1014, having a set (at least one) of program modules 1016, may be stored in memory 1006 by way of example, and not limitation, as well as an operating system, one or more application programs, other program modules, and program data. Each of the operating system, one or more application programs, other program modules, and program data or some combination thereof, may include an implementation of a networking environment. The components of the computer system 1002 may be implemented as program modules 1016 which generally carry out the functions and/or methodologies of embodiments of the invention as described herein. The system of FIG. 1 may be implemented in one or more computer systems 1002, where if they are implemented in multiple computer systems 1002, then the computer systems may communicate over a network.

Computer system/server 1002 may also communicate with one or more external devices 1018 such as a keyboard, a pointing device, a display 1020, etc.; one or more devices that enable a user to interact with computer system/server 1002; and/or any devices (e.g., network card, modem, etc.) that enable computer system/server 1002 to communicate with one or more other computing devices. Such communication can occur via Input/Output (I/O) interfaces 1022. Still yet, computer system/server 1002 can communicate with one or more networks such as a local area network (LAN), a general wide area network (WAN), and/or a public network (e.g., the Internet) via network adapter 1024. As depicted, network adapter 1024 communicates with the other components of computer system/server 1002 via bus 1008. It should be understood that although not shown, other hardware and/or software components could be used in conjunction with computer system/server 1002. Examples, include, but are not limited to: microcode, device drivers, redundant processing units, external disk drive arrays, RAID systems, tape drives, and data archival storage systems, etc.

The reference characters used herein, such as i, j, and n, are used to denote a variable number of instances of an element, which may represent the same or different values, and may represent the same or different value when used with different or the same elements in different described instances.

The present invention may be a system, a method, and/or a computer program product. The computer program product may include a computer readable storage medium (or media) having computer readable program instructions thereon for causing a processor to carry out processor operations in accordance with aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:
1. A method, comprising:
  synchronizing a first plurality of safe data commit scan operations in a plurality of data storage systems including a first data storage system configured as a primary data storage system and a second data storage system configured as a secondary data storage system, each of the first plurality of safe data commit scan operations including scanning for modified data, at a particular scan start time, a cache of one of the data storage systems in the plurality of data storage systems and destaging data cached in the scanned cache of one of the data storage systems in the plurality of data storage systems to a data storage unit of the plurality of data storage systems to ensure destaging in the scanned cache of data modified prior to the particular scan start time;

receiving in the first data storage system a completion message indicating completion of a safe data commit scan operation in at least the second data storage system of the plurality of data storage systems; and in response to receiving the completion message indicating completion of the safe data commit scan operation in at least the second data storage system, swapping roles of the first and second data storage systems such that the second data storage system is reconfigured as a primary data storage system and the first data storage system is reconfigured as a secondary data storage system.

2. The method of claim 1 wherein synchronizing the first plurality of safe data commit scan operations includes:

initiating a first safe data commit scan operation of the first plurality of safe data commit scan operations in the first data storage system;

sending a first start safe data commit scan operation message from the first data storage system to the second data storage system; and in response to the first start safe commit scan operation message, initiating a second safe data commit scan operation of the first plurality of safe data commit scan operations in the second data storage system.

3. The method of claim 2, further comprising:

following completion of the first safe data commit scan operation of the first plurality of safe data commit scan operations in the first data storage system, waiting for receipt of the completion message indicating completion of the safe data commit scan operation in at least the second data storage system; and following completion of the second safe data commit scan operation of the first plurality of safe data commit scan operations in the second data storage system, sending to the first data storage system the completion message indicating completion of the safe data commit scan operation in at least the second data storage system.

4. The method of claim 3 wherein the plurality of data storage systems includes a third data storage system configured as a tertiary data storage system, and wherein synchronizing the first plurality of safe data commit scan operations includes:

in response to receiving the first start safe data commit scan operation message sent from the first data storage system to the second data storage system, sending a second start safe data commit scan operation message from the second data storage system to the third data storage system; and in response to receiving the second start safe data commit scan operation message sent from the second data storage system, initiating a third safe data commit scan operation of the first plurality of safe data commit scan operations in the third data storage system.

5. The method of claim 4, further comprising:

following completion of the third safe data commit scan operation of the first plurality of safe data commit scan operations in the third data storage system, sending to the second data storage system a second completion message indicating completion of the safe data commit scan operation in at least the third data storage system; and following completion of the second safe data commit scan operation of the first plurality of safe data commit scan operations in the second data storage system, waiting for receipt of the second completion message indicating completion of the safe data commit scan operation in at least the third data storage system.

6. The method of claim 5 further comprising:

receiving in the second data storage system a completion message indicating completion of the safe data commit scan operation in at least the third data storage system; and in response to the completion message indicating completion of the safe data commit scan operation in at least the third data storage system, sending to the first data storage system a completion message indicating completion of the safe data commit scan operations in at least the second and third data storage systems.

7. The method of claim 3 wherein the first data storage system is a master data storage system and the second data storage system is a subsidiary data storage system, and the synchronizing the first plurality of safe data commit scan operations further includes:

sending a second start safe data commit scan operation message from the master data storage system to another subsidiary data storage system;

in response to the second start safe commit scan operation message, initiating a third safe data commit scan operation of the first plurality of safe data commit scan operations in another subsidiary data storage system;

following completion of the third safe data commit scan operation of the first plurality of safe data commit scan operations in another subsidiary data storage system, sending directly to the master data storage system a completion message indicating completion of the third safe data commit scan operation in another subsidiary data storage system; and in response to completion messages received directly from subsidiary data storage systems indicating completion of safe data commit scan operations in the subsidiary data storage systems, swapping roles of the first and second data storage systems such the second data storage system is reconfigured as a primary data storage system and the first data storage system is reconfigured as a secondary data storage system.

8. A computer program product for use with a plurality of data storage systems each having a storage controller and a data storage unit controlled by a storage controller and configured to store data, wherein the storage controller of each data storage system has a processor and a cache and wherein the computer program product comprises a computer readable storage medium having program instructions embodied therewith, the program instructions executable by a processor of a storage controller to cause processor operations, the processor operations comprising:

synchronizing a first plurality of safe data commit scan operations in a plurality of data storage systems including a first data storage system configured as a primary data storage system and a second data storage system configured as a secondary data storage system, each of the first plurality of safe data commit scan operations including scanning for modified data, at a particular scan start time, a cache of one of the data storage systems in the plurality of data storage systems and destaging data cached in the scanned cache of one of the data storage systems in the plurality of data storage systems to a data storage unit of the plurality of data storage systems to ensure destaging in the scanned cache of data modified prior to the particular scan start time;

receiving in the first data storage system a completion message indicating completion of a safe data commit scan operation in at least the second data storage system of the plurality of data storage systems; and in response to receiving the completion message indicating completion of the safe data commit scan operation in at least the second data storage system, swapping roles of the first and second data storage systems such that the second data storage system is reconfigured as a primary data storage system and the first data storage system is reconfigured as a secondary data storage system.

9. The computer program product of claim 8 wherein synchronizing the first plurality of safe data commit scan operations includes:

initiating a first safe data commit scan operation of the first plurality of safe data commit scan operations in the first data storage system;

sending a first start safe data commit scan operation message from the first data storage system to the second data storage system; and in response to the first start safe commit scan operation message, initiating a second safe data commit scan operation of the first plurality of safe data commit scan operations in the second data storage system.

10. The computer program product of claim 9, wherein the processor operations further comprise:

following completion of the first safe data commit scan operation of the first plurality of safe data commit scan operations in the first data storage system, waiting for receipt of the completion message indicating completion of the safe data commit scan operation in at least the second data storage system; and following completion of the second safe data commit scan operation of the first plurality of safe data commit scan operations in the second data storage system, sending to the first data storage system the completion message indicating completion of the safe data commit scan operation in at least the second data storage system.

11. The computer program product of claim 10 wherein the plurality of data storage systems includes a third data storage system configured as a tertiary data storage system, and wherein synchronizing the first plurality of safe data commit scan operations includes:

in response to receiving the first start safe data commit scan operation message sent from the first data storage system to the second data storage system, sending a second start safe data commit scan operation message from the second data storage system to the third data storage system; and in response to receiving the second start safe data commit scan operation message sent from the second data storage system, initiating a third safe data commit scan operation of the first plurality of safe data commit scan operations in the third data storage system.

12. The computer program product of claim 11, wherein the processor operations further comprise:

following completion of the third safe data commit scan operation of the first plurality of safe data commit scan operations in the third data storage system, sending to the second data storage system a second completion message indicating completion of the safe data commit scan operation in at least the third data storage system; and following completion of the second safe data commit scan operation of the first plurality of safe data commit scan operations in the second data storage system, waiting for receipt of the second completion message indicating completion of the safe data commit scan operation in at least the third data storage system.

13. The computer program product of claim 12 wherein the processor operations further comprise:

receiving in the second data storage system a completion message indicating completion of the safe data commit scan operation in at least the third data storage system; and in response to the completion message indicating completion of the safe data commit scan operation in at least the third data storage system, sending to the first data storage system a completion message indicating completion of the safe data commit scan operations in at least the second and third data storage systems.

14. The computer program product of claim 10 wherein the first data storage system is a master data storage system and the second data storage system is a subsidiary data storage system, and the synchronizing the first plurality of safe data commit scan operations further includes:

sending a second start safe data commit scan operation message from the master data storage system to another subsidiary data storage system;

in response to the second start safe commit scan operation message, initiating a third safe data commit scan operation of the first plurality of safe data commit scan operations in another subsidiary data storage system;

following completion of the third safe data commit scan operation of the first plurality of safe data commit scan operations in another subsidiary data storage system, sending directly to the master data storage system a completion message indicating completion of the third safe data commit scan operation in another subsidiary data storage system; and in response to completion messages received directly from subsidiary data storage systems indicating completion of safe data commit scan operations in the subsidiary data storage systems, swapping roles of the first and second data storage systems such the second data storage system is reconfigured as a primary data storage system and the first data storage system is reconfigured as a secondary data storage system.

15. The computer program product of claim 8 wherein the processor operations further comprise in response to each completion of a safe data scan commit operation, logging timestamp data indicating a time of completion of an associated safe data commit scan operation.

16. A system, comprising:

a plurality of data storage systems, each data storage system having a storage controller and a data storage unit controlled by a storage controller and configured to store data, wherein the storage controller of each data storage system has a processor and a cache wherein the plurality of data storage systems include a first data storage system configured as a primary data storage system and a second data storage system configured as a secondary data storage system; and a computer program product comprising a computer readable storage medium having program instructions embodied therewith, the program instructions executable by a processor of a storage controller to cause processor operations, the processor operations comprising:

synchronizing a first plurality of safe data commit scan operations in the plurality of data storage systems, each of the first plurality of safe data commit scan operations including scanning for modified data, at a particular scan start time, a cache of one of the data storage systems in the plurality of data storage systems and destaging data cached in the scanned cache of one of the data storage systems in the plurality of data storage systems to a data storage unit of the plurality of data storage systems to ensure destaging in the scanned cache of data modified prior to the particular scan start time;

receiving in the first data storage system a completion message indicating completion of a safe data commit scan operation in at least the second data storage system of the plurality of data storage systems; and in response to receiving the completion message indicating completion of the safe data commit scan operation in at least the second data storage system, swapping roles of the first and second data storage systems such that the second data storage system is reconfigured as a primary data storage system and the first data storage system is reconfigured as a secondary data storage system.

17. The system of claim 16 wherein synchronizing the first plurality of safe data commit scan operations includes:
initiating a first safe data commit scan operation of the first plurality of safe data commit scan operations in the first data storage system;
sending a first start safe data commit scan operation message from the first data storage system to the second data storage system; and
in response to the first start safe commit scan operation message, initiating a second safe data commit scan operation of the first plurality of safe data commit scan operations in the second data storage system.

18. The system of claim 17, wherein the processor operations further comprise:
following completion of the first safe data commit scan operation of the first plurality of safe data commit scan operations in the first data storage system, waiting for receipt of the completion message indicating completion of the safe data commit scan operation in at least the second data storage system; and
following completion of the second safe data commit scan operation of the first plurality of safe data commit scan operations in the second data storage system, sending to the first data storage system the completion message indicating completion of the safe data commit scan operation in at least the second data storage system.

19. The system of claim 18 wherein the plurality of data storage systems includes a third data storage system configured as a tertiary data storage system, and wherein synchronizing the first plurality of safe data commit scan operations includes:
in response to receiving the first start safe data commit scan operation message sent from the first data storage system to the second data storage system, sending a second start safe data commit scan operation message from the second data storage system to the third data storage system; and
in response to receiving the second start safe data commit scan operation message sent from the second data storage system, initiating a third safe data commit scan operation of the first plurality of safe data commit scan operations in the third data storage system.

20. The system of claim 19, wherein the processor operations further comprise:
following completion of the third safe data commit scan operation of the first plurality of safe data commit scan operations in the third data storage system, sending to the second data storage system a second completion message indicating completion of the safe data commit scan operation in at least the third data storage system; and
following completion of the second safe data commit scan operation of the first plurality of safe data commit scan operations in the second data storage system, waiting for receipt of the second completion message indicating completion of the safe data commit scan operation in at least the third data storage system.

21. The system of claim 20 wherein the processor operations further comprise:
receiving in the second data storage system a completion message indicating completion of the safe data commit scan operation in at least the third data storage system; and
in response to the completion message indicating completion of the safe data commit scan operation in at least the third data storage system, sending to the first data storage system a completion message indicating completion of the safe data commit scan operations in at least the second and third data storage systems.

22. The system of claim 18 wherein the first data storage system is a master data storage system and the second data storage system is a subsidiary data storage system, and the synchronizing the first plurality of safe data commit scan operations further includes:
sending a second start safe data commit scan operation message from the master data storage system to another subsidiary data storage system;
in response to the second start safe commit scan operation message, initiating a third safe data commit scan operation of the first plurality of safe data commit scan operations in another subsidiary data storage system;
following completion of the third safe data commit scan operation of the first plurality of safe data commit scan operations in another subsidiary data storage system, sending directly to the master data storage system a completion message indicating completion of the third safe data commit scan operation in another subsidiary data storage system; and
in response to completion messages received directly from subsidiary data storage systems indicating completion of safe data commit scan operations in the subsidiary data storage systems, swapping roles of the first and second data storage systems such the second data storage system is reconfigured as a primary data storage system and the first data storage system is reconfigured as a secondary data storage system.

* * * * *